US007549119B2

(12) United States Patent
McCaffrey et al.

(10) Patent No.: US 7,549,119 B2
(45) Date of Patent: Jun. 16, 2009

(54) METHOD AND SYSTEM FOR FILTERING WEBSITE CONTENT

(75) Inventors: William Joseph McCaffrey, Los Angeles, CA (US); Doug Carl Dohring, Glendale, CA (US)

(73) Assignee: Neopets, Inc., Glendale, CA (US)

( * ) Notice: Subject to any disclaimer, the term of this patent is extended or adjusted under 35 U.S.C. 154(b) by 515 days.

(21) Appl. No.: 10/992,255

(22) Filed: Nov. 18, 2004

(65) Prior Publication Data

US 2006/0123338 A1 Jun. 8, 2006

(51) Int. Cl.
*G06F 17/21* (2006.01)
*G06F 17/24* (2006.01)
*G06F 17/28* (2006.01)
*G06F 17/30* (2006.01)

(52) U.S. Cl. ....................... 715/234; 715/249; 715/255; 715/271; 715/741

(58) Field of Classification Search ................ 715/532, 715/513, 205, 208, 234, 273, 249, 255, 271, 715/741; 709/206; 707/6
See application file for complete search history.

(56) References Cited

U.S. PATENT DOCUMENTS 4,638,445 A * 1/1987 Mattaboni .................... 701/23
4,641,263 A * 2/1987 Perlman et al. ............... 703/24
4,782,442 A 11/1988 Kojima et al. ............... 709/220
4,783,806 A * 11/1988 Nakamura et al. .......... 704/239
5,608,624 A * 3/1997 Luciw ........................ 715/532
5,987,606 A * 11/1999 Cirasole et al. ............... 726/11
6,438,632 B1 * 8/2002 Kikugawa ................... 710/100
6,721,047 B2 * 4/2004 Shimoda et al. .......... 356/237.5
6,772,196 B1 * 8/2004 Kirsch et al. ................ 709/206
7,061,491 B2 * 6/2006 Happel ....................... 345/440
2002/0059454 A1 * 5/2002 Barrett et al. .............. 709/245
2002/0116629 A1 * 8/2002 Bantz et al. ................ 713/200
2004/0086179 A1 * 5/2004 Ma et al. .................... 382/177

OTHER PUBLICATIONS

Wikipedia, "Recursion", Jun. 21, 2007, www.wikipedia.com, pp. 1-8.*
Yi et al, "Transforming Loops to Recursioni for Multi-Level Memory Hierarchies", published: Year 2000, ACM, pp. 169-181.*

* cited by examiner

*Primary Examiner*—Stephen S Hong
*Assistant Examiner*—Wilson Tsui
(74) *Attorney, Agent, or Firm*—Stanley J. Gradisar Attorney At Law; Stanley J. Gradisar

(57) ABSTRACT

A method and system for filtering website content prevents undesirable words or phrases from appearing in website postings sent by website users. The invention intercepts all content submitted by the user, and processes the content before posting it on the website. Intercepted content is first processed through a blocking subroutine, which first calls a preprocessing subroutine and then calls a content breakdown subroutine. The content breakdown subroutine utilizes a recursive comparison subroutine to identify undesirable words or phrases against previously identified words or phrases stored in a database. Options may be set in the system to replace the inappropriate content with acceptable content and then post the message or block the message entirely. The user may or may not be notified that their message has been blocked or replaced. The program then calls a matching subroutine for further processing of the intercepted content.

45 Claims, 16 Drawing Sheets ooops! 1008

Figure 10B:
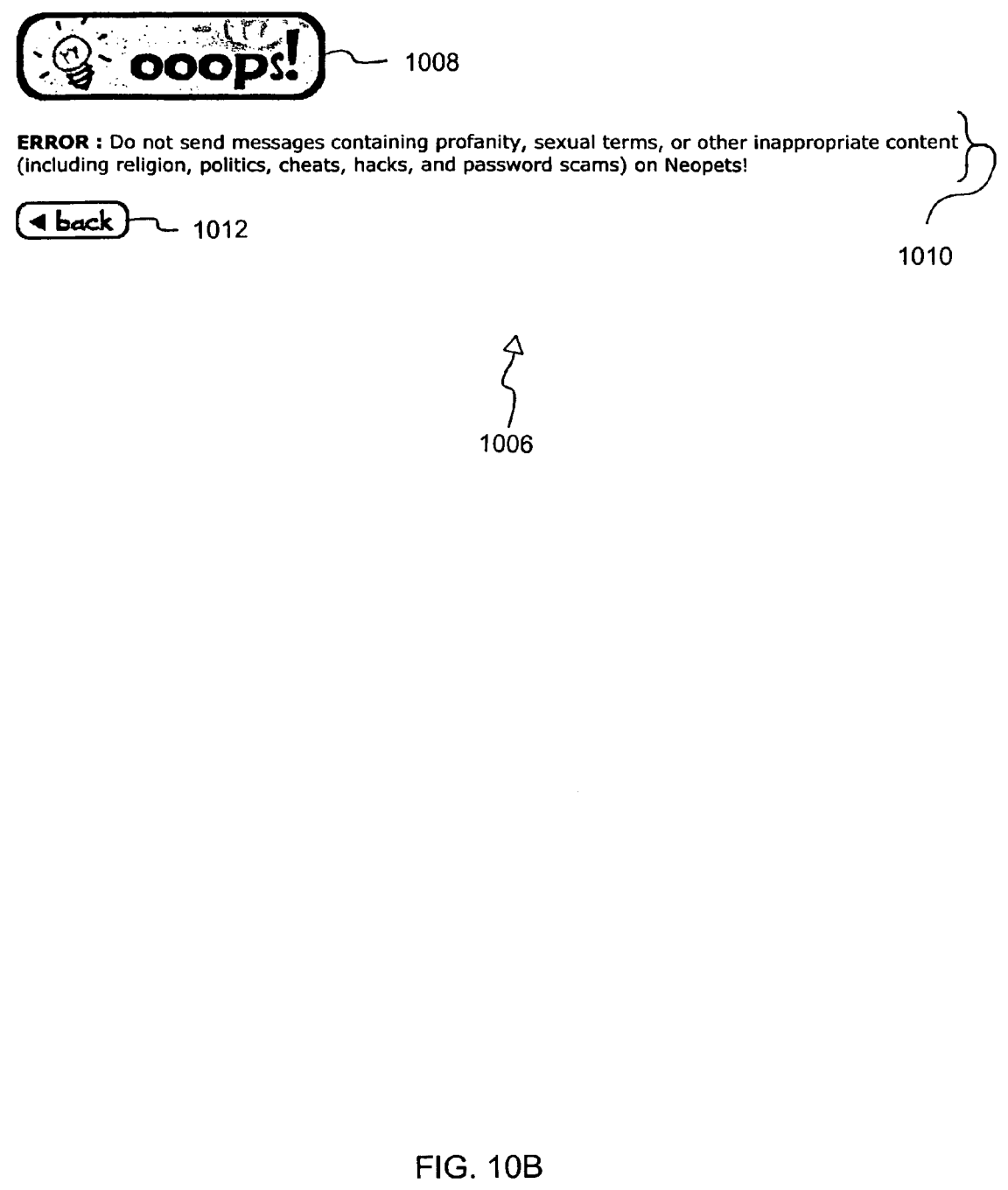

ERROR : Do not send messages containing profanity, sexual terms, or other inappropriate content (including religion, politics, cheats, hacks, and password scams) on Neopets!

◀ back 1012

1010

1006

Figure 11B:
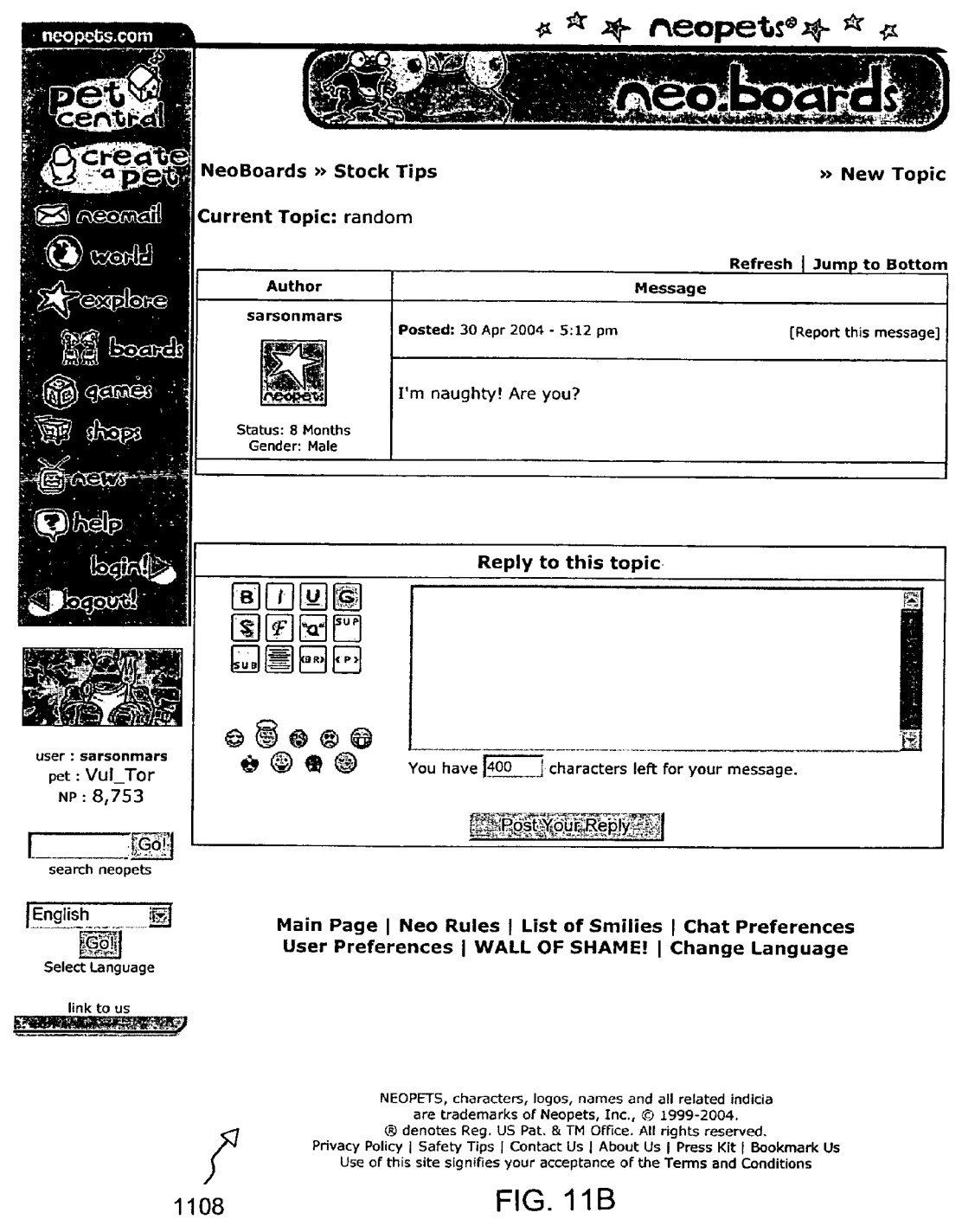

FIG. 10B neopets.com neopets® neo.boards pet central
create a pet
neomail
world
explore
boards
games
shops
news
help
login!
logout!

NeoBoards » Stock Tips

» New Topic

Current Topic: random

Refresh | Jump to Bottom

| Author | Message |
|---|---|
| sarsonmars | Posted: 30 Apr 2004 - 5:12 pm [Report this message] |
| Status: 8 Months<br>Gender: Male | I'm naughty! Are you? |

Reply to this topic

You have 400 characters left for your message.

Post Your Reply user : sarsonmars
pet : Vul_Tor
NP : 8,753

Go!
search neopets

English
Go!
Select Language link to us

Main Page | Neo Rules | List of Smilies | Chat Preferences
User Preferences | WALL OF SHAME! | Change Language NEOPETS, characters, logos, names and all related indicia
are trademarks of Neopets, Inc., © 1999-2004.
® denotes Reg. US Pat. & TM Office. All rights reserved.
Privacy Policy | Safety Tips | Contact Us | About Us | Press Kit | Bookmark Us
Use of this site signifies your acceptance of the Terms and Conditions

1108

Figure 11C:
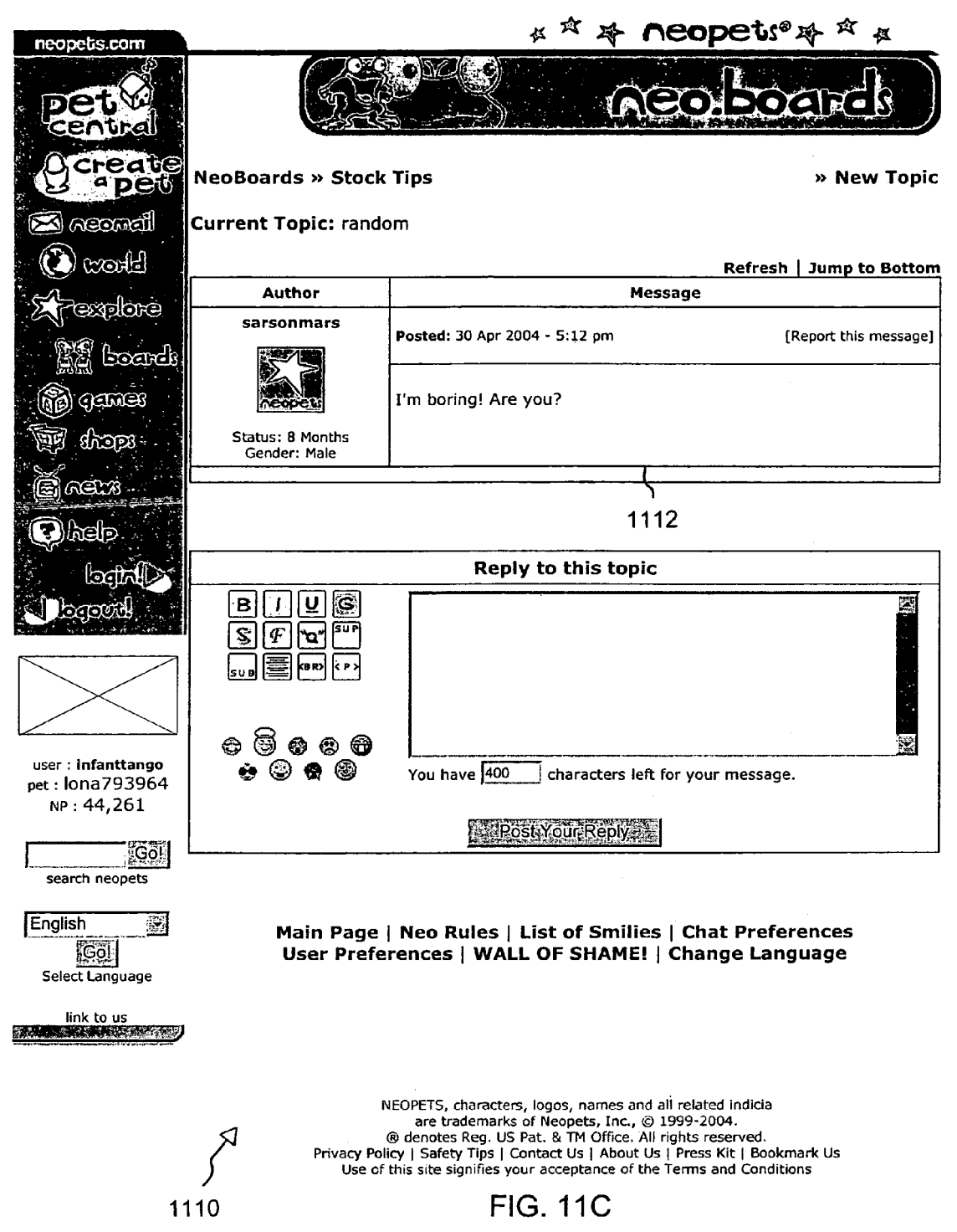

FIG. 11B neopets.com neopets® neo.boards pet central
create a pet
neomail
world
explore
boards
games
shops
news
help
login!
logout!

user : infanttango
pet : lona793964
NP : 44,261

Go!
search neopets

English
Go!
Select Language link to us

NeoBoards » Stock Tips » New Topic

Current Topic: random

Refresh | Jump to Bottom

| Author | Message |
| --- | --- |
| sarsonmars | Posted: 30 Apr 2004 - 5:12 pm [Report this message] |
| Status: 8 Months<br>Gender: Male | I'm boring! Are you? |

1112

Reply to this topic

B I U S SUP SUB <BR> <P>

You have 400 characters left for your message.

Post Your Reply

Main Page | Neo Rules | List of Smilies | Chat Preferences
User Preferences | WALL OF SHAME! | Change Language NEOPETS, characters, logos, names and all related indicia are trademarks of Neopets, Inc., © 1999-2004. ® denotes Reg. US Pat. & TM Office. All rights reserved.
Privacy Policy | Safety Tips | Contact Us | About Us | Press Kit | Bookmark Us
Use of this site signifies your acceptance of the Terms and Conditions

Figure 12:
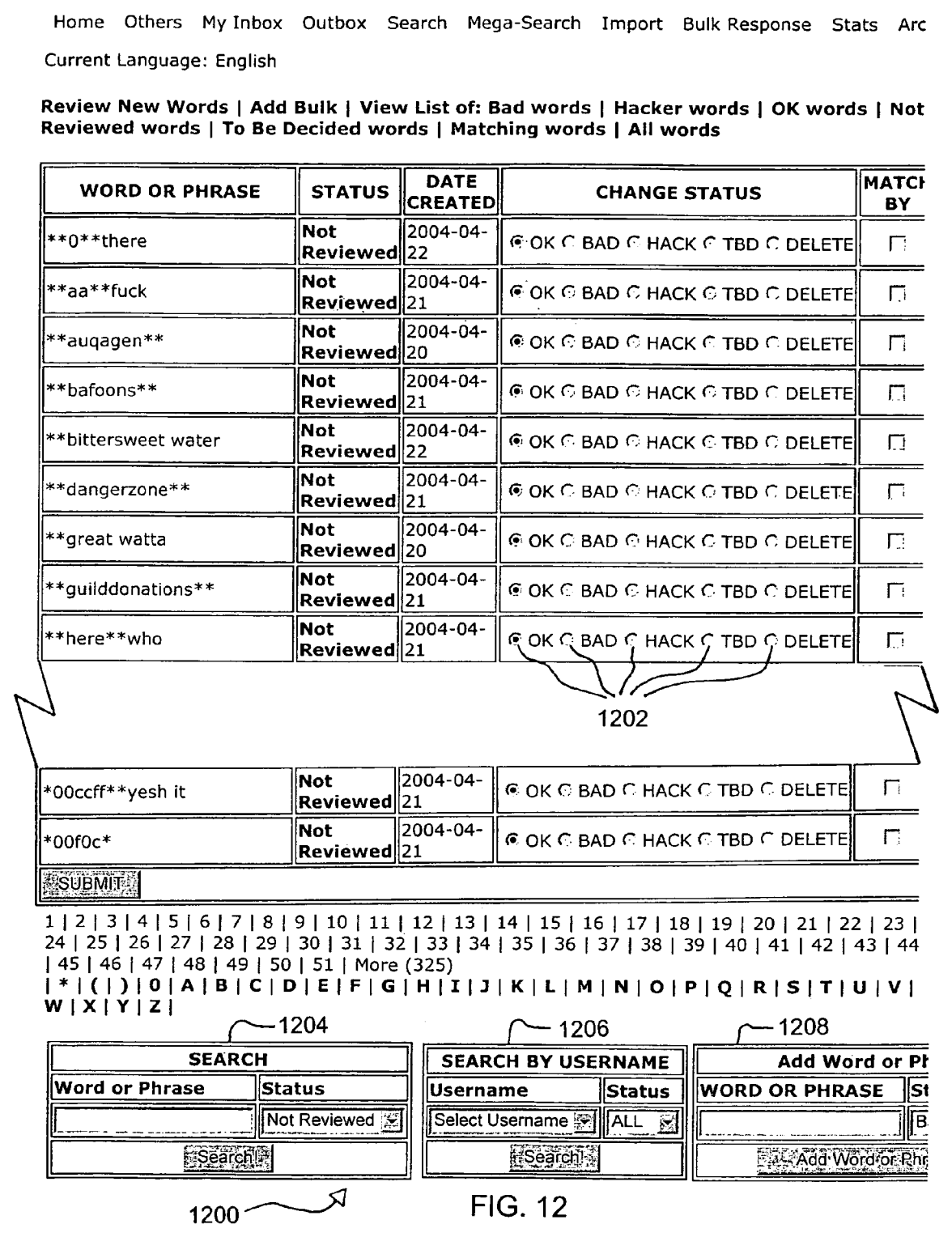

Home Others My Inbox Outbox Search Mega-Search Import Bulk Response Stats Arc

Current Language: English

Review New Words | Add Bulk | View List of: Bad words | Hacker words | OK words | Not Reviewed words | To Be Decided words | Matching words | All words

| WORD OR PHRASE | STATUS | DATE CREATED | CHANGE STATUS | MATCH BY |
|---|---|---|---|---|
| **0**there | Not Reviewed | 2004-04-22 | OK BAD HACK TBD DELETE | |
| **aa**fuck | Not Reviewed | 2004-04-21 | OK BAD HACK TBD DELETE | |
| **auqagen** | Not Reviewed | 2004-04-20 | OK BAD HACK TBD DELETE | |
| **bafoons** | Not Reviewed | 2004-04-21 | OK BAD HACK TBD DELETE | |
| **bittersweet water | Not Reviewed | 2004-04-22 | OK BAD HACK TBD DELETE | |
| **dangerzone** | Not Reviewed | 2004-04-21 | OK BAD HACK TBD DELETE | |
| **great watta | Not Reviewed | 2004-04-20 | OK BAD HACK TBD DELETE | |
| **guilddonations** | Not Reviewed | 2004-04-21 | OK BAD HACK TBD DELETE | |
| **here**who | Not Reviewed | 2004-04-21 | OK BAD HACK TBD DELETE | |
| *00ccff**yesh it | Not Reviewed | 2004-04-21 | OK BAD HACK TBD DELETE | |
| *00f0c* | Not Reviewed | 2004-04-21 | OK BAD HACK TBD DELETE | |

1202

SUBMIT

1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | More (325)

**| * | ( | ) | 0 | A | B | C | D | E | F | G | H | I | J | K | L | M | N | O | P | Q | R | S | T | U | V | W | X | Y | Z |**

1204

| SEARCH | |
|---|---|
| Word or Phrase | Status |
| | Not Reviewed |
| Search | |

1206

| SEARCH BY USERNAME | |
|---|---|
| Username | Status |
| Select Username | ALL |
| Search | |

1208

| Add Word or Ph | |
|---|---|
| WORD OR PHRASE | St |
| | B |
| Add Word or Phr | |

METHOD AND SYSTEM FOR FILTERING WEBSITE CONTENT

FIELD OF THE INVENTION

This invention relates to websites, and more particularly, to filtering website content to prevent undesirable words or phrases from appearing in website postings by users on the website.

BACKGROUND OF THE INVENTION

On many online websites, registered and/or unregistered users (referred to as "Users") can, among other things, create accounts, play games, and communicate with each other. Messages (referred to as "Content") can be sent between Users, or to the internet population in general, through an internal or external email system, an instant messaging system, message boards, chat rooms, or any other method of displaying Content to other Users. Content sent by some Users may be inappropriate for the purpose of the website or otherwise in violation of the policies established by the website owner or sponsor for its Users. This is especially true for websites geared towards children. The present invention filters Content sent by Users that contains undesirable words or phrases, and can either block the Content from being viewed or replace the Content with language acceptable to the website owner or sponsor.

BRIEF DESCRIPTION OF THE DRAWINGS

FIG. 10B shows an exemplary screen shot of an "Input Blocked" Web page that is returned to the user's Web browser.

FIG. 11B shows an exemplary screen shot of a web page returned to the browser of the user after creating the new topic.

FIG. 11C shows an exemplary screen shot of replaced content that may be viewed by a different user who has navigated to the new topic on the message board.

FIG. 12 shows an exemplary screen shot of a Web Page that may be accessed to review terms that have not been reviewed.

DETAILED DESCRIPTION OF THE INVENTION

The invention may be practiced as a system. The invention may also be practiced as a method, or more specifically as a method of operating a computer system. Such a system would include appropriate program means for executing the method of the invention. Also, an article of manufacture, such as a pre-recorded disk or other similar computer program product, for use with a computer processing system, could include a storage medium and program means recorded thereon for directing the computer processing system to facilitate the practice of the method of the invention. It will be understood that such apparatus and articles of manufacture also fall within the spirit and scope of the invention.

The present invention may be utilized by website owners or sponsors, by companies having an intranet for their employees, by an internet service provider, or any other type of organization that utilizes email type communications, hereinafter referred to as the "Communication Forum". Collectively, any one of these organizations providing a Communication Forum is hereinafter referred to as a "Sponsor".

Figure 10A:
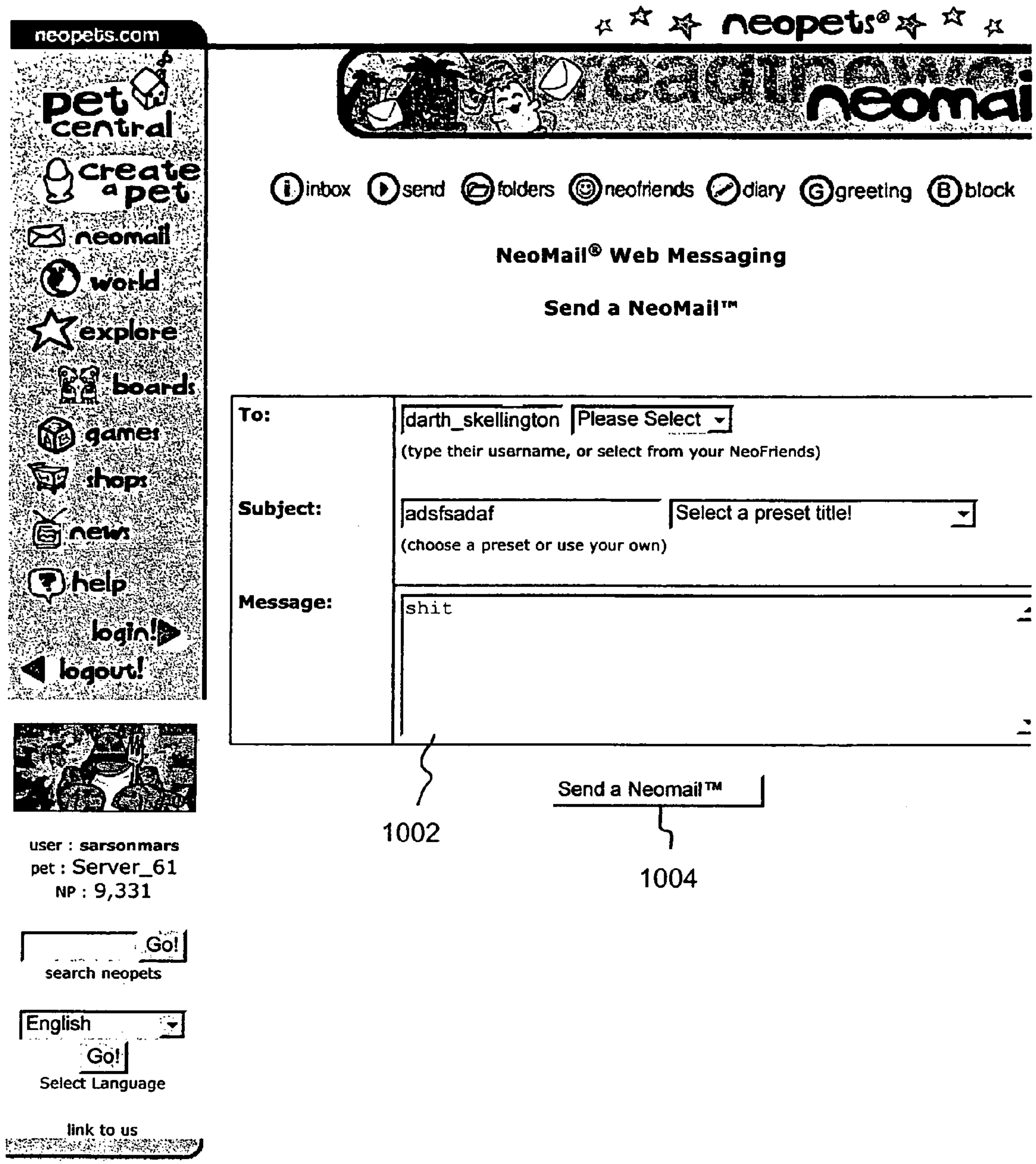
FIG. 10A shows an exemplary screen shot of a Web page where a user is attempting to send an email with inappropriate Content.

From a User's perspective, interaction with the filtering system and method while utilizing the Communication Forum is limited. If a User puts into Content words or phrases (referred to as "Terms") that are acceptable (referred to as "OK" Terms), the User will not notice the filtering system and method. When a User submits Content that contains undesirable words or phrases (referred to as "Bad" Terms), the Sponsor has several options to choose from on how to handle the submission of "Bad" Terms. For example, the Sponsor may choose to have the User receive an "Input Blocked" Web page (see FIGS. 10A and 10B), is which informs the User that the User's submission of Content was blocked, indicates the Term that was undesirable, reminds the User about the Sponsor's relevant policies, and directs the User to re-submit the Content with the appropriate changes. Optionally, the "Input Blocked" Web page could omit information on the blocked Term, Sponsor policies, or re-submit instructions, and could include any other message from the Sponsor to the User.

As another option, instead of having the input blocked, the undesirable Term could be replaced by an acceptable Term designated by the Sponsor. The User may or may not be informed about the replacement through an "Input Replaced" Web page (see FIGS. 11A, 11B, and 11C) that gives the Sponsor the same options as the "Input Blocked" Web page discussed above. The User could also be logged as having attempted to enter a "Bad" Term. Users who are repeat offenders may at some point be put on probation, temporarily denied access to the Communication Forum, or permanently denied access to the Communication Forum.

Figure 9:
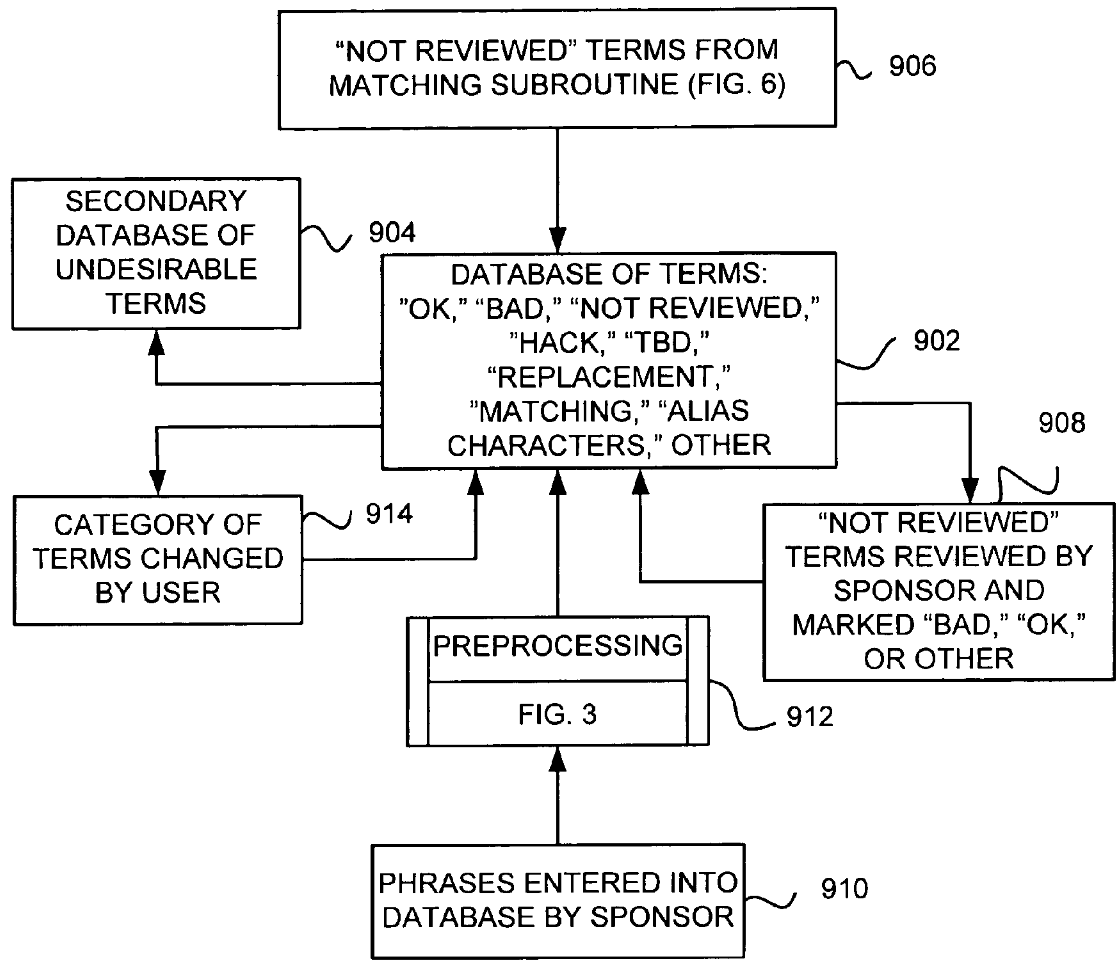
FIG. 9 shows a block/flow diagram illustrating the database of the method of filtering website content in an embodiment of the present invention.

Referring now to the Figures, in which like reference numerals refer to structurally and/or functionally similar elements thereof, FIG. 9 shows a block/flow diagram illustrating the database of the method of filtering website content in an embodiment of the present invention. Referring now to FIG. 9, the filtering system and method of the present invention maintains the Terms in a Database 902. Database 902 may contain lists of "Bad" Terms, "OK" Terms, and "Not Reviewed" Terms, and could also contain lists of Terms commonly used by hackers (referred to as "Hack" Terms), to be determined "TBD" Terms, "Replacement" Terms, or other categories definable by the Sponsor. Any Term in the database can also be designated as a "Matching" Term. "Matching" Terms are Terms that are used by the Matching Subroutine (see FIG. 6) to identify similar Terms for review by the Sponsor. The "Matching" Terms are chosen because they represent the roots of the majority of "Bad" Terms.

The Matching Subroutine (block 612, FIG. 6) returns "Not Reviewed" Terms to Database 902 in block 906. The Sponsor then has an opportunity to review the "Not Reviewed" Terms and designate a category for them ("Bad", "OK", etc.). In block 910 the Sponsor may also enter phrases that the Sponsor does not want posted in the Communication Forum. These entered phrases are sent in step 912 through the Preprocessing Subroutine of FIG. 3, and are then returned to Database 902, where they are added to the databases marked as selected, and added to the list of "Bad" Terms used by the filtering software. The Sponsor may determine that "OK" Terms can appear in the Communication Forum, "Bad" Terms may not appear, and "TBD" Terms should be further reviewed before making a decision. "Hack" Terms may or may not be allowed. Whether or not they are allowed, "Hack" Terms can be flagged for review by the Sponsor when they appear. "Replacement" Terms are assigned to one or more "Bad" and/or "Hack" Terms. The "Replacement" Terms are the Terms that will take the place of the "Bad" and/or "Hack" Terms in the Content if the Sponsor is using the replacement option discussed below. The "Not Reviewed" Terms are generated by the Matching Subroutine (block 612, FIG. 6), inserted into Database 902, and subsequently reviewed and put into the appropriate Database 902 category by the Sponsor in block 908 through the Sponsor Interface (see FIG. 12) The Terms in Database 902 that will not be allowed in the Communication Forum ("Bad" Terms and possibly "Hack" Terms or other Terms) are copied to a Secondary Database of Undesirable Terms 904 to enable fast searches in real time by the filtering system and method of the present invention.

The Sponsor Interface to the filtering system and method of the present invention (see FIG. 12) allows the Sponsor in block 908 to review "Not Reviewed" Terms, and in block 914 to search or view, add or delete, or change the category of Terms in the Database. When reviewing "Not Reviewed" Terms, the Terms are displayed next to the Database category choices and a "Delete" choice. The Sponsor then chooses in which category the Terms belong. The default category is "OK". While making this choice, placing the cursor over the Term displays the Content that the word or phrase (Term) was used in so the Sponsor can understand the context of the Term (see FIG. 13). After choosing a category for a Term, the Content is discarded. Left clicking on the Term or User Identification ("User ID") brings up a new Web page showing site administrative functions and information on the User account that posted the Content so that the Sponsor may warn, freeze, suspend, or take other action against a User. Once reviewed and entered into the Database, Terms can be reviewed through a search by Term, by category of Term, or by Terms reviewed by specific Sponsor employees on a per-employee basis. While viewing Terms shown by the search, the Sponsor can add, delete, or change the category of a Term.

The Terms entered into the database by the Sponsor can reflect typical "Bad" words, bad phrases (phrases containing all "Bad" words, or a mix of "Bad" and "OK" words) slang, or misspelled "Bad" words, or non-English "Bad" words.

Figure 1:
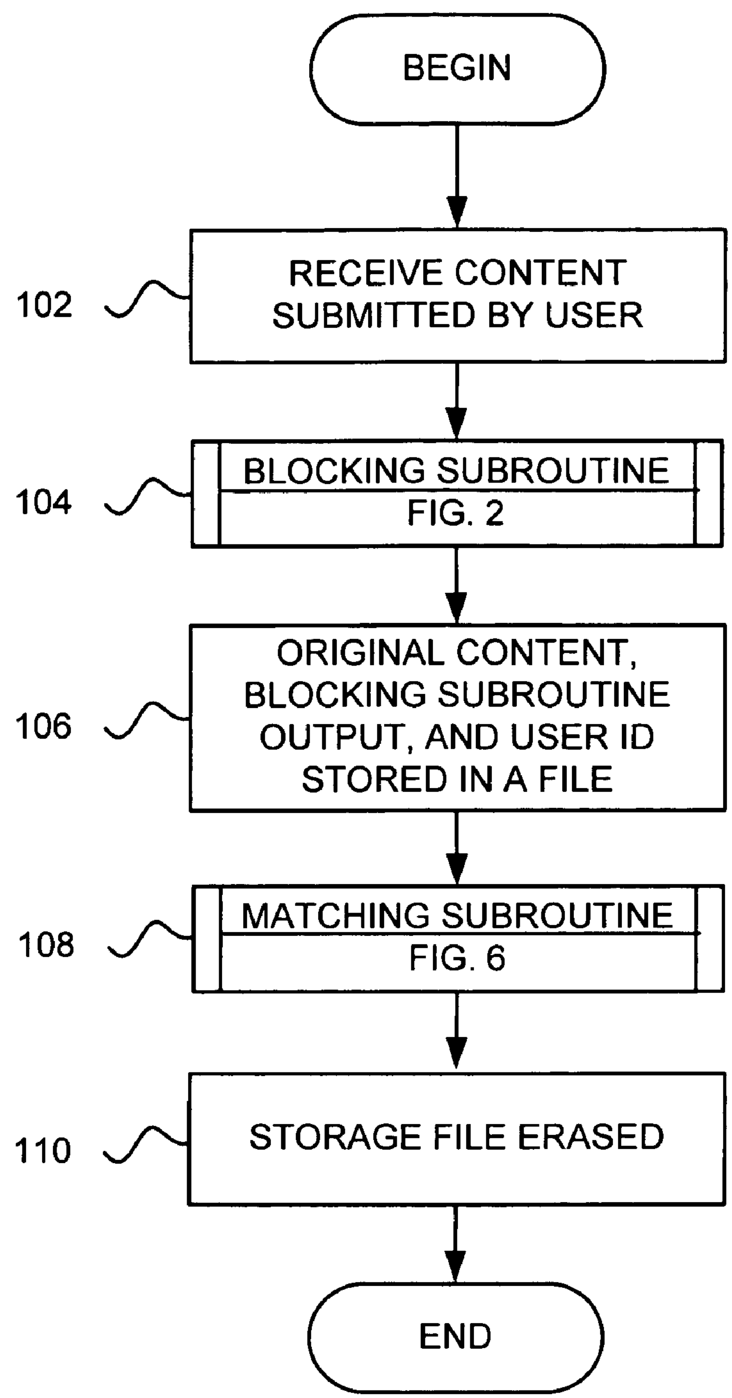
FIG. 1 shows a flow diagram illustrating the overall method of filtering website content in an embodiment of the present invention.

FIG. 1 shows a flow diagram illustrating the overall method of filtering website content in an embodiment of the present invention. Referring now to FIG. 1, Content submitted by a User for dissemination over the Communication Forum is intercepted for processing and copied in step 102 by a software program (hereinafter referred to as the "Program") which embodies the method and system of the present invention. The Program then calls the first of two major subroutines in step 104, the Blocking Subroutine (described more fully in relation to FIG. 2), and passes to it the intercepted Content. The Blocking Subroutine calls a Preprocessing Subroutine (described more fully in relation to FIG. 3), and then calls a Content Breakdown Subroutine (described more fully in relation to FIG. 4), which calls a Recursive Comparison Subroutine (described more fully in relation to FIG. 5). The objective of the Blocking Subroutine is to prevent undesirable words that have been identified in the Secondary Database of Undesirable Terms 904 from appearing in the Communication Forum when they are submitted for posting by a User.

After returning from the Blocking Subroutine, in step 106 the original Content received in step 102, the output from the Blocking Subroutine, and the User ID of the User submitting the Content are stored in a file. The program then calls the Matching Subroutine in step 108 (described more fully in relation to FIG. 6) and passes to it the original Content. The Matching Subroutine calls the Preprocessing Subroutine of FIG. 3, and then calls a Matching Breakdown Subroutine (described more fully in relation to FIG. 7), which calls a Recursive Matching Comparison Subroutine (described more fully in relation to FIG. 8).

After processing by the Matching Subroutine in step 108, in step 110 the storage file from step 106 is erased, and the method of the present invention ends. The steps of FIG. 1 are repeated each time Content is submitted by a user for dissemination over the Communication Forum.

Figure 2:
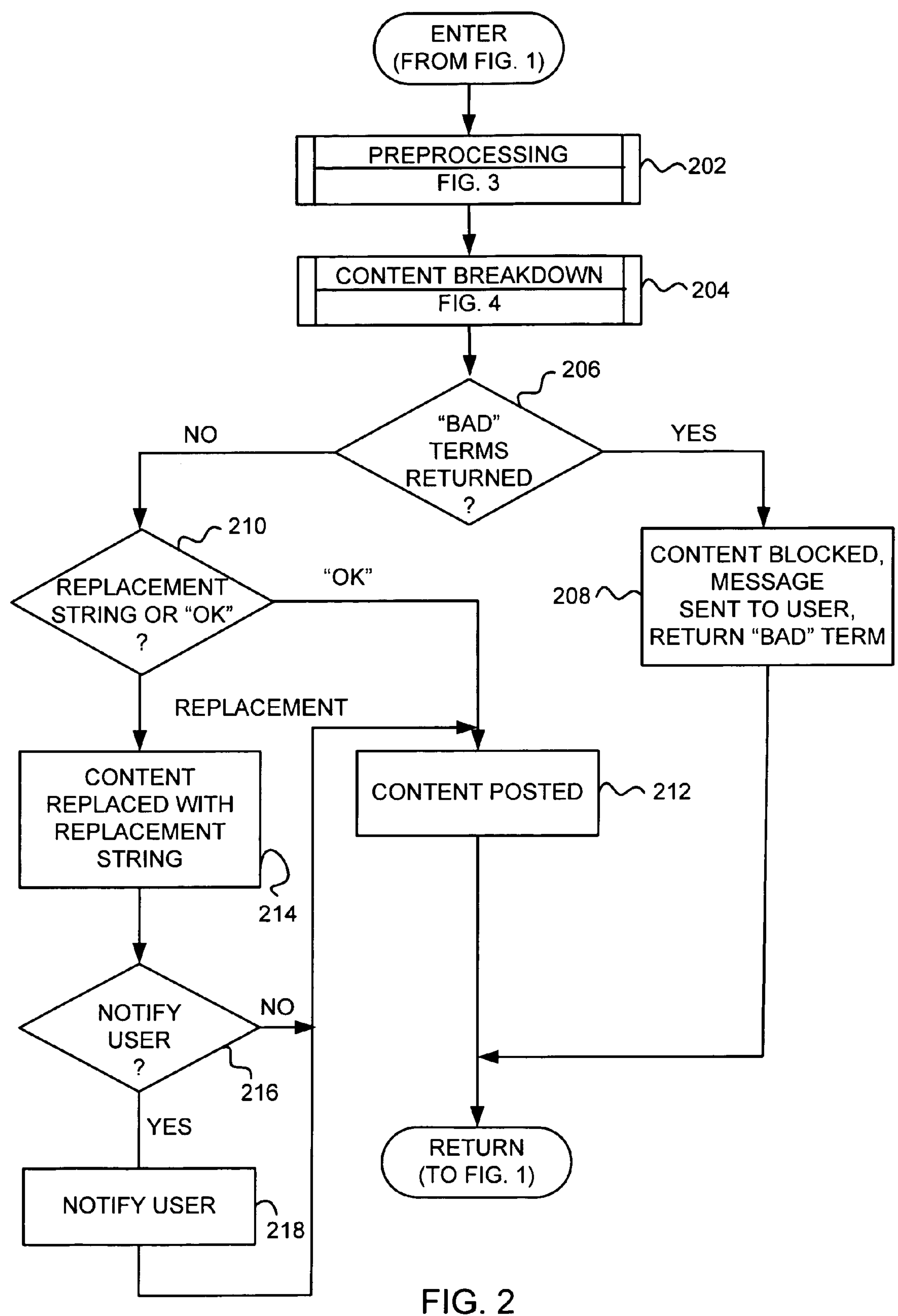
FIG. 2 shows a flow diagram illustrating the blocking subroutine in an embodiment of the present invention.

FIG. 2 shows a flow diagram illustrating the blocking subroutine called from FIG. 1 in an embodiment of the present invention. Referring now to FIG. 2, by way of example, the following sample Content, which could be submitted by a User, is shown within quotation marks (the quotation marks are not a part of the Content), and will be used throughout the description of the invention in the context of this example:

1.0 "The $ly brown Phox."

There is a space between each word, and there are five blank spaces following the last word and before the period at the end of the sentence. After being called from step 104, the Blocking Subroutine in step 202 calls the Preprocessing Subroutine of FIG. 3 and passes to it the Content. The word or phrase size to be processed is limited by the size of the field in the database, which may be increased or decreased depending upon a particular application and the database used.

Figure 3:
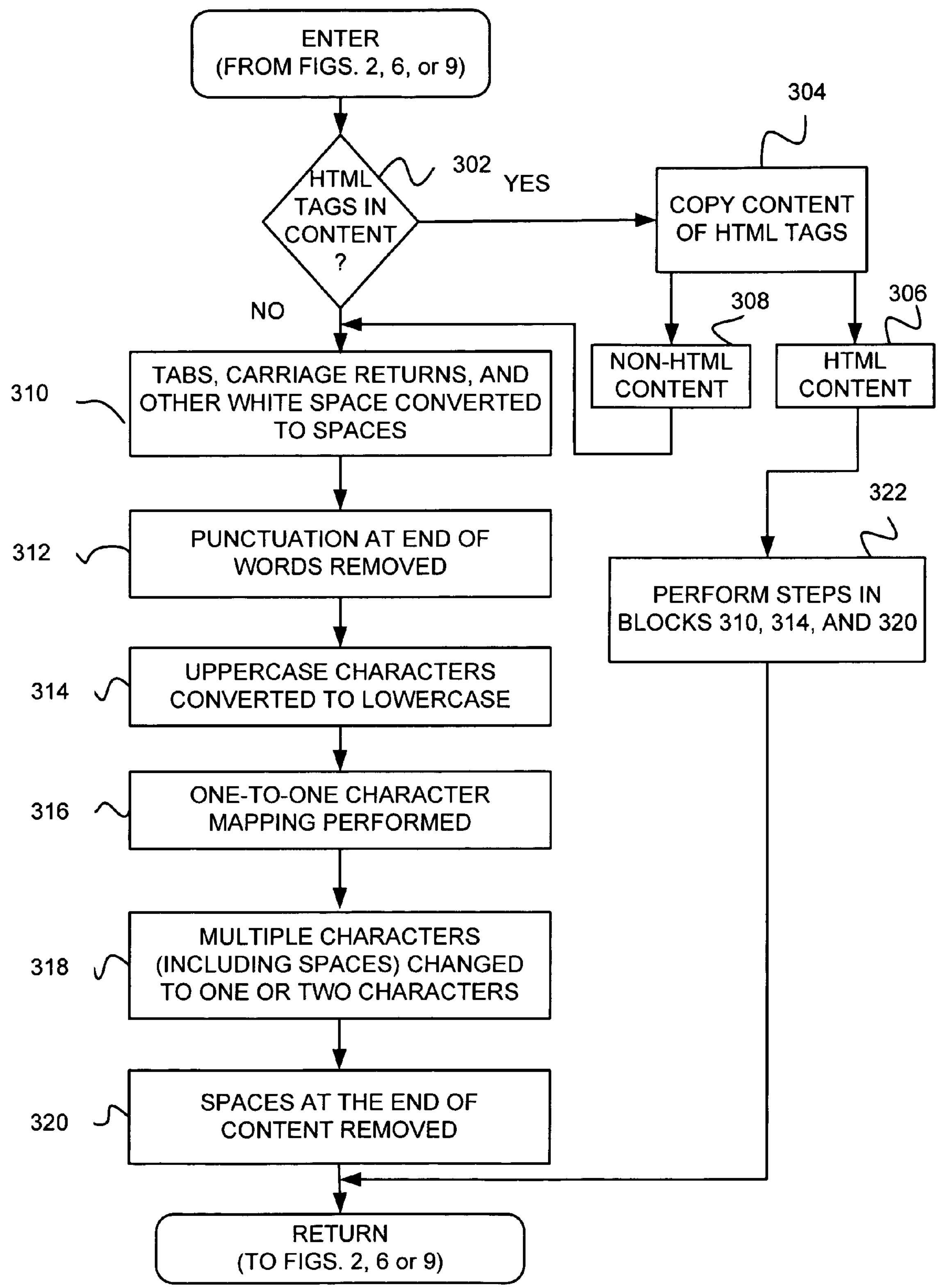
FIG. 3 shows a flow diagram illustrating the preprocessing subroutine in an embodiment of the present invention.
Figure 6:
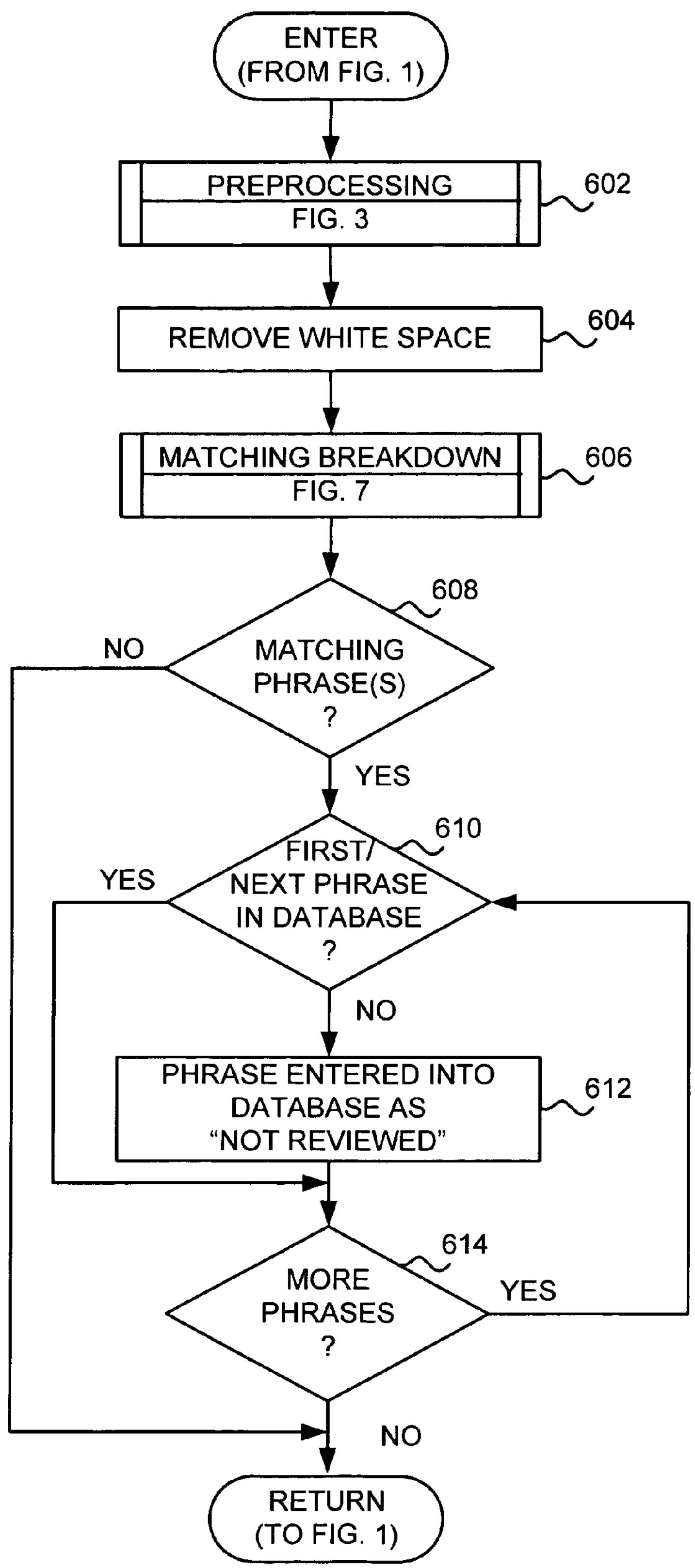
FIG. 6 shows a flow diagram illustrating the matching subroutine in an embodiment of the present invention.

FIG. 3 shows a flow diagram illustrating the preprocessing subroutine called from FIGS. 2, 6, or 9 in an embodiment of the present invention. Referring now to FIG. 3, the goals of the Preprocessing Subroutine are to reduce the wide variety of expression in Content to its least common denominator, and to enable the analysis of Terms hidden in the Content. This results in searches on fewer words or phrases, and a faster processing performance by the Program. The Preprocessing Subroutine performs phonetic changes (e.g., mapping "ph" to "f"), symbolic changes (e.g., mapping "$" to "s"), superfluous character elimination (e.g., reducing "aaaaaaaaaaaaa" to "aa") , and similar character usage changes (e.g., numbers changed to "0").

In step 302 the Content passed to the Preprocessing Subroutine is first analyzed for any HTML tags. There are two situations where HTML tags are important. One situation is innocent, where a User is creating a web page and it is desirable to scan the words that appear on the web page separate from the HTML directives. The other situation is where a User places HTML tags within the text (which do not appear to the target audience) in an attempt to break the filter, or places JavaScript commands within the HTML tags to disrupt the page contents or exploit security holes in the browser.

If no HTML tags are found, the Content is then sent on to step 310. If HTML tags are found, in step 304 the contents of the HTML tags are separated from the non-HTML text. The non-HTML text is concatenated with a single space being put in to replace where the HTML tags were in step 308, and then sent on to step 310. The text inside the HTML tags is copied from the Content and put into a file in step 306. This copied text from the HTML tags is treated as a new Content submission from the User and is processed more simply than the non-HTML text due to the structured requirements of the HTML code. Any URLs contained in the HTML tags are not altered. Accordingly, in step 322, the steps described in steps 310, 314, and 320 (described below) are performed on the HTML text. After this simplified processing, control returns to the step which called the Preprocessing Subroutine (Step 202 of FIG. 2, step 602 of FIG. 6, or step 912 of FIG. 9).

In step 310 all white space, which is defined as spaces, tabs, returns, end of line characters, or any other character that will be displayed on a display device as a space or white space to a viewer, is converted to spaces. In step 312 all punctuation characters at the end of strings of characters (hereinafter referred to as "Words") are removed. All uppercase characters are then converted to their corresponding lowercase characters in step 314.

In step 316 the Content is sent though a character mapping process. In a first sub-step, the Program identifies phonetic and symbolic similarities in characters of the Content and changes the characters to another set of predetermined characters that represents the common sound or meaning. However, a character or string of characters is changed only if it has a predefined one-to-one correspondence with a target character. For example, an exclamation point character "!" is not changed to the letter "l" because the exclamation point character "!" could represent lowercase letter "i" or lowercase letter "l" or the number one "1". Characters with multiple possible corresponding target characters such as this are addressed as "Alias Characters" in the Recursive Comparison Subroutine of FIG. 5 and/or the Recursive Matching Comparison Subroutine of FIG. 8.

As an example of phonetic mapping, the letters "ph" are changed to the letter "f" because the sound made when "ph" is pronounced is the sound "f" makes when it is pronounced.

The following are several symbolic mapping examples. The number "13" is changed to lowercase letter "b" due to its visual similarity to uppercase letter "B". The character string "|_|" (which is a pipe character followed by an underscore character followed by another pipe character) is changed to lowercase letter "u" due to its visual similarity to uppercase letter "U". The dollar sign character "$" is changed to lowercase letter "s". The plus sign character "+" and the Cyrillic character "T" are changed to lowercase letter "t".

In a second sub-step, numeric characters are replaced with zeros "0", unless previously changed under a phonetic or symbolic rule. In a third sub-step, non-numeric and non-alphabetic characters, such as "#", "%", "^", "&", and others including commas and periods (but excluding an open parenthesis "(", close parenthesis ")", an exclamation point "!", a dollar sign "$", and others handled through the above phonetic or symbolic rules or handled as Alias Characters (see FIGS. 5 and 8)) are changed to an asterisk(s) "*".

In addition to recognizing the standard Roman alpha-numeric characters, the Program may also recognize Unicode characters and characters from other alphabets (Cyrillic, Greek, Japanese, Chinese, etc.) and change them to their symbolic or phonetic representations in English and other languages, as necessary.

After the character mapping is complete, in step 318 any consecutively repeated characters are changed to either a single component character or two of the component characters. The determination of whether to change such consecutively repeated characters to either one or two of the component characters is made pursuant to a defined list. For example, "oooooooo" would be changed to "oo" whereas "kkkkkkkk" would be changed to "k". Finally, any remaining spaces at the end of the Content are deleted in step 320, and control returns to the step which called the Preprocessing Subroutine (Step 202 of FIG. 2, step 602 of FIG. 6, or step 912 of FIG. 9).

The following shows the results of applying the preprocessing steps to our example Content:

1.0 "The $ly brown Phox."

There are no HTML tags to deal with in step 302, nor is there any white space that needs to be removed in step 310. In step 312, the period at the end of the sentence is removed, leaving:

1.1 "The $ly brown Phox"

In step 314, the capital letters "T" and "P" would be changed to lowercase letters leaving:

1.2 "the $ly brown phox"

In step 316, the phonetic mapping changes the letters "ph" to the letter "f", and the symbolic mapping changes the dollar sign "$" to lowercase letter "s" leaving:

1.3 "the sly brown fox"

In step 318, the multiple spaces at the end of the phrase are reduced to one space, leaving:

1.4 "the sly brown fox"

Finally, in step 320, the space at the end of the phrase is deleted, leaving:

1.5 "the sly brown fox"

Figure 4:
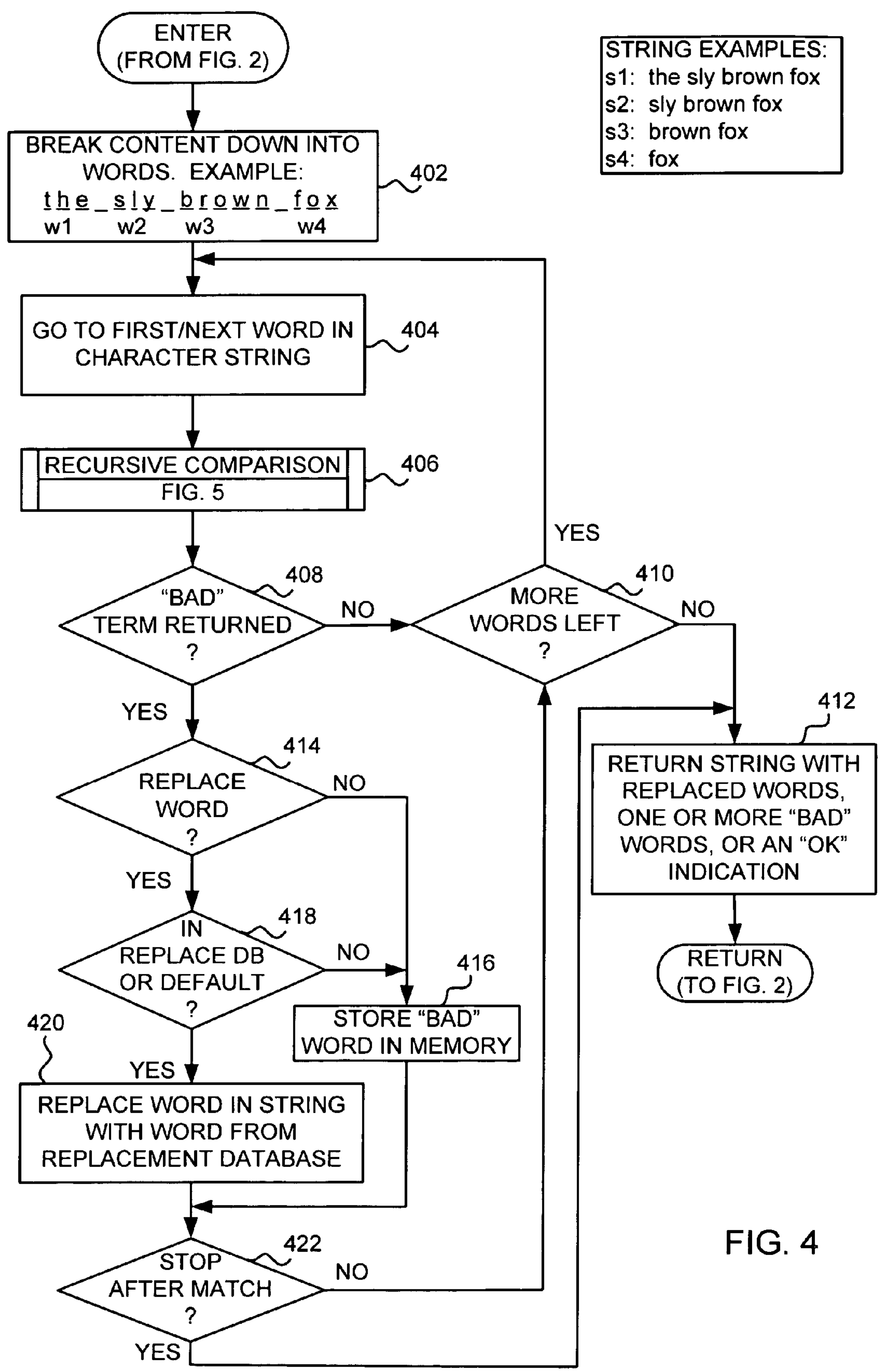
FIG. 4 shows a flow diagram illustrating the content breakdown subroutine in an embodiment of the present invention.

The Preprocessed Content 1.5 as shown above is returned to FIG. 2 and control passes to step 204. In step 204 the Blocking Subroutine of FIG. 4 is called. The Blocking Subroutine of FIG. 4 searches for undesirable Terms in the Preprocessed Content and calls the Recursive Comparison Subroutine of FIG. 5.

FIG. 4 shows a flow diagram illustrating the content breakdown subroutine called from FIG. 2 in an embodiment of the present invention. Referring now to FIG. 4, in step 402, the Content received is characterized as Words (strings of characters) separated by spaces (except for Oriental character sets, which are treated character by character.) For example, the Preprocessed Content 1.5 in the example above is characterized as having four words: W1, W2, W3, and W4 separated by spaces. In the example, W1 is "the", W2 is "sly", W3 is "brown", and W4 is "fox" separated by spaces as shown below:

1.6 "the sly brown fox"

W1 W2 W3 W4

Figure 5:
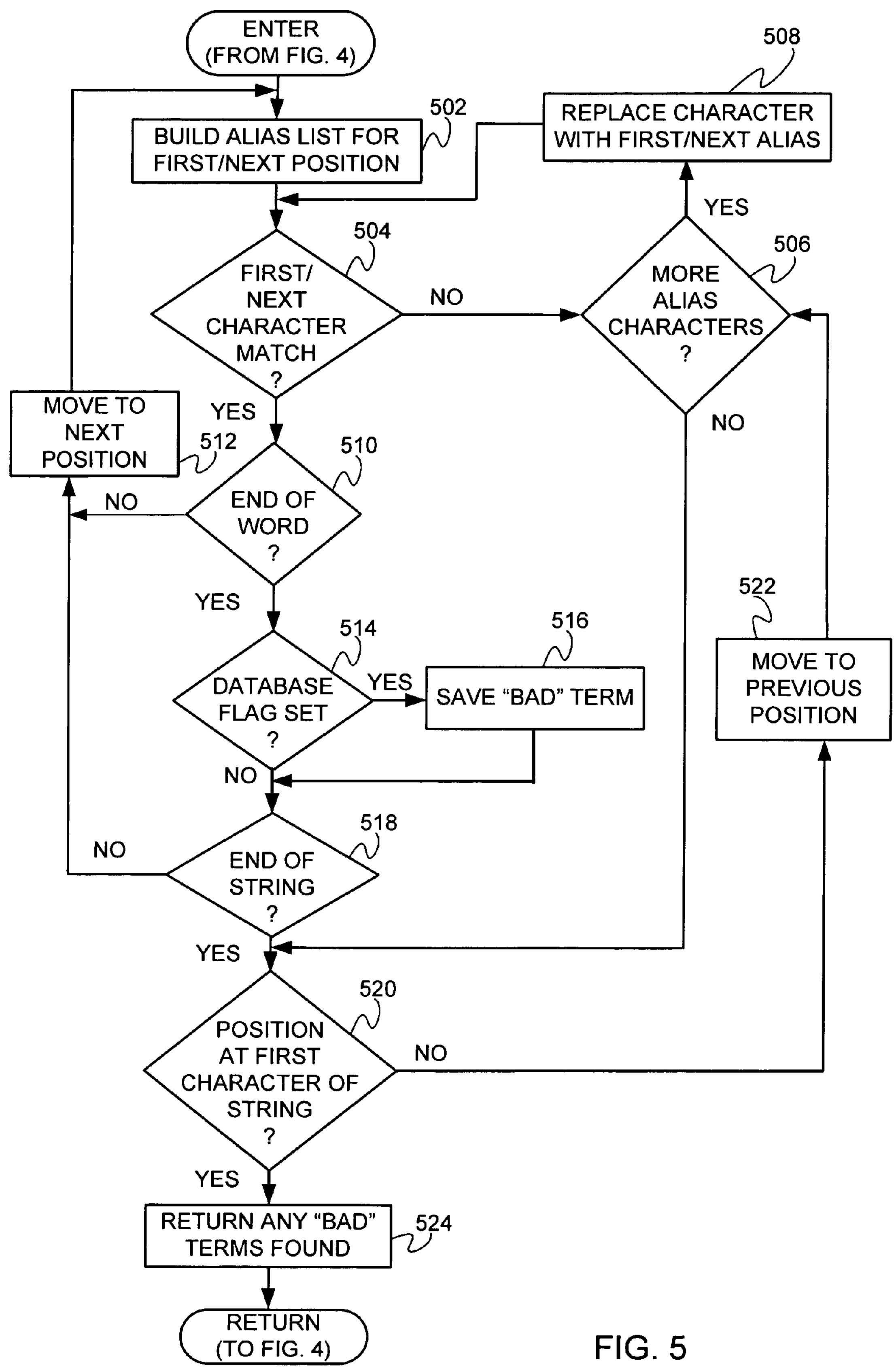
FIG. 5 shows a flow diagram illustrating the recursive comparison subroutine in an embodiment of the present invention.

Next, in step 404 the Program breaks up the Content into multiple strings of characters beginning with each of the four Words identified above, and passes these strings one at a time to step 406, which calls the Recursive Comparison Subroutine of FIG. 5. The string beginning with the first Word is the first string passed to the Recursive Comparison Subroutine. In our example, the four strings are:

1.7 S1: "the sly brown fox"

1.8 S2: "sly brown fox"

1.9 S3: "brown fox"

1.10 S4: "fox"

The Program takes the string of characters starting with the first Word, "the", and sends the string 1.7, "the sly brown fox", to the Recursive Comparison Subroutine.

FIG. 5 shows a flow diagram illustrating the recursive comparison subroutine called from FIG. 4 in an embodiment of the present invention. Referring now to FIG. 5, in step 502 the first character of the string is checked against a predefined "Alias Character" List to determine if there are any Alias Characters for the first character. If so, a temporary Alias Character List is built for the first character.

Alias Characters are predefined character mappings in which more than one character is mapped to a single character. For instance, as described above, an exclamation point "!" could be either an exclamation point "!", the letter "i", the letter "l", or the number "1". These predefined sets of characters are in an ordered sequence in the Program, such as the ordered sequence of "!", "i", "l", "1". Whenever any one of these characters is detected, the Program will run the string of characters through the Recursive Comparison Subroutine with each of the predefined characters in the order set in the Program. The Program will keep track of which Alias Character has been checked and move to the next Alias Character when prompted.

In our example, the character string "the sly brown fox", the letter "l" in the word "sly" could be a representation of an exclamation point "!", the letter "i", the letter "l", or the number "1". Assuming the defined order of these characters is "!", "i", "l", "1", the Program will first run the string "the s!y brown fox", then when prompted, the Program will run the string "the siy brown fox", and then again, when prompted, the string "the sly brown fox", then finally, when prompted, the string "the s1y brown fox".

Alias Characters, like the Character Mapping above, are chosen to approximate phonetic, symbolic or any other similarities in characters of the Content. In addition to recognizing the standard Roman alpha-numeric characters, the Program's Alias Character sets may also include Unicode characters and characters from other alphabets (Cyrillic, Greek, Japanese, Chinese, etc.).

Spaces are treated somewhat differently from other Alias Characters. The Alias "Character" for a space is the deletion of the space from the string. When the Program detects a space in the string in step 502, the Program will first run the string with the space through the rest of the steps in the Recursive Comparison Subroutine. Assuming that a "Bad" Term is not matched in step 504, when the Program checks for other Alias Characters in step 506, the Program will delete the space from the string and run the string through the Recursive Comparison Subroutine steps again. This allows the Program to detect undesirable words that simply have spaces or other white space between the individual characters.

For example, in the string "the sly brown fox", when the Program reaches the space between the words "the" and "sly", the Program will run one string of "the sly brown fox" and another string, when prompted, of "thesly brown fox".

In step 502, after the Alias Character List has been built for the first character in the string, and the first Alias Character is substituted for the first character, the Program notes that it has started the progression for the Alias Characters, and control flows to step 504. Or, if there are no Alias Characters for the first character in the string in step 502, control flows to step 504 and the Program tries to match the first Alias Character (or original character) in the first position to any of the "Bad" Terms in the Secondary Database of Undesirable Terms 904 (FIG. 9).

To determine if the string contains a "Bad" Term, the first character of the string of Content is compared against the first character of all of the "Bad" Terms in the Secondary Database Of Undesirable Terms 904. In our example, the "t" of the string "the sly brown fox" would be compared against the first character of the "Bad" Terms in the Secondary Database Of Undesirable Terms 904. When there is no match between the characters, the Program then determines if there are any Alias Characters left for the current position in step 506. If one or more Alias Characters are left, the Program replaces the first character of the string with the next Alias Character in the predefined sequence in step 508 and checks again in step 504 the first character of the modified string against the first character of the "Bad" Terms in the Secondary Database of Undesirable Terms 904 to determine if there is a match.

In our example, the Program will first run the phrase "the s !y brown fox". Then, after steps 506 and 508 have been performed, the phrase "the siy brown fox" will be run, and then after steps 506 and 508 have been performed again, "the sly brown fox" will be run, and finally, after steps 506 and 508 have been performed again, "the s1y brown fox" will be run. Assuming that there are no matches found in step 504, and that all Alias Characters have been run from step 506, the Program then determines in step 520 if the Program is pointing to the first string position on its way back up from the recursion. The string position refers to the order of characters of the current string being examined. In our example, "the sly brown fox", the beginning or first position is the letter "t", the second position is the letter "h", the third position is the letter "e", the fourth position is the space " " between the "e" and the "s", and the fifth position is the letter "s", etc.

It should be noted that the Program only compares characters of the string and the "Bad" Terms in the Secondary Database of Undesirable Terms 904 if those characters are in the same or equal positions. This means that if the Program is currently pointing to the fifth character of the string, it will only be comparing that character against the fifth character of a "Bad" Term in the Secondary Database of Undesirable Terms 904 that has matched the first four characters of the string.

If the Program determines in step 520 that it is not pointing to the first string position on its way back up from the recursion, then in step 522 the Program steps back up a level in the recursion and points to the previous position and again determines in step 506 if any Alias Characters are left to be checked in that position. If Alias Characters are left in that position, then, as above, the Program will replace the current Alias Character with the next Alias Character in step 508 and compare it in step 504 to the Secondary Database of Undesirable Terms 904 to determine if there is a match. If step 506 determines that there are no more Alias Characters left for comparison in that position, the Program will again determine if it is pointing to the first position in the string in step 520. If it is not in the first position, the Program will continue to regress to the first position while checking for Alias Characters that have not been compared against the Secondary Database of Undesirable Terms 904. When the Program reaches the first position in step 520, then in step 524 the Program returns any "Bad" Terms found to the Content Breakdown Subroutine of FIG. 4.

In our example, if the first four characters of the string were a match, the Program would then point to the fifth string position, the letter "s" of the string "the sly brown fox". Assuming that the "s" is not a match in step 504, and that there are no more remaining Alias Characters in step 506 (in any position), then in step 520 the Program determines that it is not pointing to the first position, so in step 522 the Program would step back up a level in the recursion to the previous position and point to the fourth position, the space character " ". The Program determines in step 506 that there are no remaining Alias Characters in the fourth position, and then continues stepping back through the recursion levels in steps 520, 522, and 506 until it reaches the first position. Once the Program determines in step 520 that it is pointing to the first position, the Program returns in step 524 any "Bad" Terms found to the Content Breakdown Subroutine of FIG. 4.

If step 504 determines that the first character in the string matches the first character of one or more "Bad" Terms in the Secondary Database of Undesirable Terms, then the Program checks to see if the character in the string of Content is at the end of a Word in step 510. In our example for the string of "the sly brown fox", the current character that the Program is checking is the letter "t". The letter "t" is not at the end of the Word "the"; the character "e" is at the end of that Word. If there is not an end of Word indication in step 510, then in step 512 the Program calls itself recursively and moves to the next position in the string of Content. At this next position, the Program again builds an Alias Character List as described above in step 502 and then in step 504 compares the character in the second position to the character in the second position of all of the "Bad" Terms in the Secondary Database of Undesirable Terms 904 that matched the first character. If there is another match in step 504, then the Program would again check in step 510 for the end of the Word indication. Assuming that each character in the following positions are matches, this sequence of advancing positions will continue until the Program reaches an end of Word indication in the string. In our example for the string of "the sly brown fox", the Program would reach an end of Word indication after a match for the letter "e" in the Word "the".

When the Program reaches an end of Word indication in step 510, the Program then determines in step 514 if a flag has been set in the Secondary Database of Undesirable Terms 904. A flag is set in the secondary database at the end of each "Bad" Term. This means that the Program will only identify a match if the exact Term in the database exists as a Word or sequence of Words in the string. For example, if the secondary database contained the "Bad" Terms "brown" and "brownie", and the string being evaluated was "brown fox", the Program would determine that the string matched "brown", but not "brownie" because "brownie" does not have a flag set at the position for the letter "n" as does "brown". Similarly, if the Term was "brown" and the string was "brownie", these would not match because the end of Word indication in the string is not reached until the position of the letter "e", which is after the flag in the database at the position of the letter "n". The "i" and the "e" of "brownie" do not match any corresponding characters after the "n" in "brown".

This process also allows "Bad" Terms in the database consisting of multiple Words (a phrase such as "the sly" as opposed to just the single words "the" or "sly") to be detected in the string. For example, if the Secondary Database of Undesirable Terms 904 contained the Term "the sly" then the database flag would not be set until the position of the letter "y" in word "sly". Since in our example the string is "the sly brown fox", the "Bad" Term would be detected. The "Bad" Term would not be detected if the string was "thesly brown fox" since the Term contains a space between "the" and "sly".

It is possible, however, to instruct the Program to ignore spaces in the "Bad" Terms in the Secondary Database of Undesirable Terms 904 when comparing the Content to the "Bad" Terms. Ignoring the spaces will result in more hits and more "Input Blocked" Web pages sent to the User. For example, if the Program is not ignoring the spaces, "thesly" would not be detected as above. If the Program is ignoring spaces, then the Content of "thesly" would be detected as would Content of "the sly", because of the Alias Character elimination of the space as described above regarding Alias Characters.

If a flag is set in the Secondary Database of Undesirable Terms 904, the Program saves the Term as originally submitted in the Content as a "Bad" Term in memory in step 516 and returns to the recursion at step 518. If at a later time the Program finds another match, then this later match, if matched in a later position, will replace the previously saved "Bad" Term. This determines which Term is the best match to the string (the match in which the most characters of the string match the Term). For example, if the "Bad" Terms in the Secondary Database of Undesirable Terms 904 were "the" and "the sly", and the string being examined was "the sly brown fox", then the Program would determine a match and would save a "Bad" Term in step 516 for first "the", and then "the sly". The preferred Term that would be saved is "the sly" because it matched more of the characters in the string. The preferred Term "the sly" is a match in the seventh position as opposed to the Term "the" which is a match in the third position.

If step 514 determines that a flag is not set in that position of a Term in the Secondary Database of Undesirable Terms 904, then the Program determines if it has reached the end of the string in step 518. If it has not, the Program in step 512 will call itself recursively and moves to the next position of the string and builds an Alias Character List for that position in step 502. If the Program determines it has reached the end of the string in step 518, then the Program will begin regressing back to the beginning of the string as described above in relation to steps 520, 522 and 506 if it is not pointing to the first position of the string, checking any Alias Characters in any position that the Program may not yet have checked. When in step 520 the Program reaches the beginning of the string, then the Program returns any "Bad" Terms found to the Content Breakdown Subroutine of FIG. 4.

Returning now to FIG. 4, after returning from the Recursive Comparison Routine of FIG. 5, step 408 determines if any "Bad" Terms have been returned from step 524 of FIG. 5. If step 408 determines that no "Bad" Terms have been returned, then in step 410 the Program determines if any Words are left to test in the current Content being examined. If yes, the Program in step 404 advances to the next Word in the string of characters and in step 406 sends the string beginning with the next Word through the Recursive Comparison Subroutine of FIG. 5. In our example, the first string of the Content that was sent through the Recursive Comparison Subroutine was the string 1.7 beginning with the first Word "the". The second Word in the string is "sly", and the second string sent, 1.8, is "sly brown fox". The third word in the string is "brown" and the third string sent, 1.9, is "brown fox". The fourth and last word in the string is "fox" and the last string, 1.10, is "fox".

Assuming no "Bad" Terms are found, the Program will continue advancing through the Words in the current Content and send strings beginning with those Words though the Recursive Comparison Subroutine of FIG. 5. When step 410 determines that there are no Words left in the current Content to be examined, then the Program in step 412 will return to the Blocking Subroutine of FIG. 2 an indication of no "Bad" Terms found.

If, however, step 408 determines that the Recursive Comparison Subroutine of FIG. 5 has found a "Bad" Term, then in step 414 the Program will determine if the replacement option has been chosen by the Sponsor. If the replacement option has not been chosen, the Program will store the "Bad" Term in memory in step 416. Terms not replaced will be blocked later when control of the Program returns to FIG. 2. If the replacement option has been chosen in step 414, then in step 418 the Program will check Database 902 to determine if the "Bad" Term has a designated "Replacement" Term. If a "Replacement" Term has been designated, then the Program will replace the "Bad" Term in the Content with the designated "Replacement" Term in step 420. The Sponsor may also choose to have a default "Replacement" Term. The default "Replacement" Term would be used whenever the replacement option has been chosen in step 414, but the specific "Bad" Term does not have a designated "Replacement" Term. Then, if a default "Replacement" Term is chosen, the Program will replace the "Bad" Term with the default "Replacement" Term when there is no designated "Replacement" Term. If a "Bad" Term does not have a designated replacement Term in step 418, and if the default option is not chosen, then the Program will store the "Bad" Term in memory in step 416, just as if the replacement option had not been chosen.

In our example, if the Sponsor had determined that the Word "the" was a "Bad" Term and should be replaced with "that", then when the Word "the" is detected in the Content "the sly brown fox", the Program will replace "the" with "that" resulting in a replacement string of "that sly brown fox".

If the replacement option was not chosen in step 414, resulting in a "Bad" Term having been stored in memory in step 416, the Sponsor may choose to direct the Program in step 422 to look only for one match and stop. If the Sponsor has selected this option, then in step 412 the Program will stop and return the "Bad" Term to FIG. 2. If the Sponsor has directed the Program to look for more than one match in step 422, the Program will determine in step 410 if there are any Words left to test in the current Content. If yes, the Program will go to the next Word in the character string in step 404 and pass the next string in step 406 to the Recursive Comparison Subroutine of FIG. 5. If step 408 determines that the Recursive Comparison Subroutine returns any other "Bad" Terms, then the additional "Bad" Terms are processed through the steps outlined above. When step 410 determines that there are no more Words left in the current Content, then the Program in step 412 will return any "Bad" Terms found to the Blocking Subroutine of FIG. 2. If no "Bad" Terms are found, the Program will return to FIG. 2 with an "OK" indication.

Thus, when the Program finishes checking all of the Words in the current Content, the Program will then have either a replacement string, or a replacement string and saved "Bad" Terms (if a "Bad" Term was not in the replacement database and the default option was not chosen), or an "OK" indication. The Program in step 412 will return with the replacement string and any "Bad" Terms found, or an "OK" indication, to the Blocking Subroutine of FIG. 2.

Returning now to FIG. 2, step 206 determines if any "Bad" Terms have been returned. If yes, then in step 208 the Program will block the Content submission from the User from being posted to the Communication Forum, even though the replacement option was chosen. The Program will only replace the string if no "Bad" Terms are present. Also in step 208 a message is sent to the User that his Content has been blocked. This message will inform the User that his submission has been blocked and may (FIG. 10) or may not (FIG. 11) inform the user of the "Bad" Terms found. If the message does inform the user of the "Bad" Terms found, the message can contain either the original "Bad" Terms as found in the Content, or the corresponding "Bad" Terms from the database. After the submission has been blocked, then also in step 208 the "Bad" Terms are returned to FIG. 1 and the Blocking Subroutine ends.

If step 206 determines that no "Bad" Terms have been returned, then in step 210 the Program will check for a replacement string or an "OK" indication. If there is an "OK" indication, the Program in step 212 allows the Content to be posted to the Communication Forum and control returns to FIG. 1. If step 210 determines that there is a replacement string, all or part of the original Content will be replaced by the replacement string in step 214 yielding an altered content. Step 216 determines if the option to notify the User that his Content has been altered has been selected. If yes, then in step 218 the User is notified that some Terms in the Content were replaced. Then in step 212, the modified Content is posted to the Communication Forum. If step 216 determines that the notify option has not been selected, then the modified Content is posted to the Communication Forum in step 212 and control returns to FIG. 1.

Returning now to FIG. 1, when the Program receives the return data from the Blocking Subroutine of FIG. 2, the Program stores the User ID of the User, the original Content, and the output of the Blocking Subroutine ("OK" indication, "Bad" Term, and/or any replacement string) in a file in step 106 for future processing through the Matching Subroutine in step 108. The Content is saved rather than processed immediately to conserve computing resources. The Matching Subroutine of FIG. 6 is run once per day, typically at midnight or some other time when the computing resources are not in heavy use. Once sent though the Matching Subroutine of FIG. 6, the storage file is erased in step 110 and the method and system of the present invention ends.

FIG. 6 shows a flow diagram illustrating the matching subroutine called from FIG. 1 in an embodiment of the present invention. Referring now to FIG. 6, the objective of the Matching Subroutine is to identify new permutations of "Matching" Terms and add the permutations to the database as "not reviewed" Terms. Sponsor representatives can then further classify the newly identified "Matching" Terms as either "OK" or "Bad." The Content received by the Matching Subroutine is first sent through the Preprocessing Subroutine (FIG. 3) in step 602. The identical steps are followed in the Preprocessing Subroutine as described above.

After returning from the Preprocessing Subroutine, the Program in step 604 removes any white space remaining in the preprocessed Content. White space as defined above is spaces, tabs, returns, end of lines, or any other character that will be displayed as a space or white space to a viewer. Since the Preprocessing Subroutine converted all white space to spaces, the Matching Subroutine will be removing only spaces. The spaces are removed in the Matching Subroutine because it is not seeking to match a "Bad" Term in the Content against a specific "Bad" Term in Database 902 as in the Blocking Subroutine of FIG. 2, but is instead attempting to find any sequence of characters that may be a new representation of a "Matching" Term. Applying the Preprocessing Subroutine to our example 1.0, "The $ly brown Phox.", resulted in preprocessed Content of "the sly brown fox". Eliminating the spaces from the preprocessed Content in step 604 leaves:

1.11 "theslybrownfox"

Figure 7:
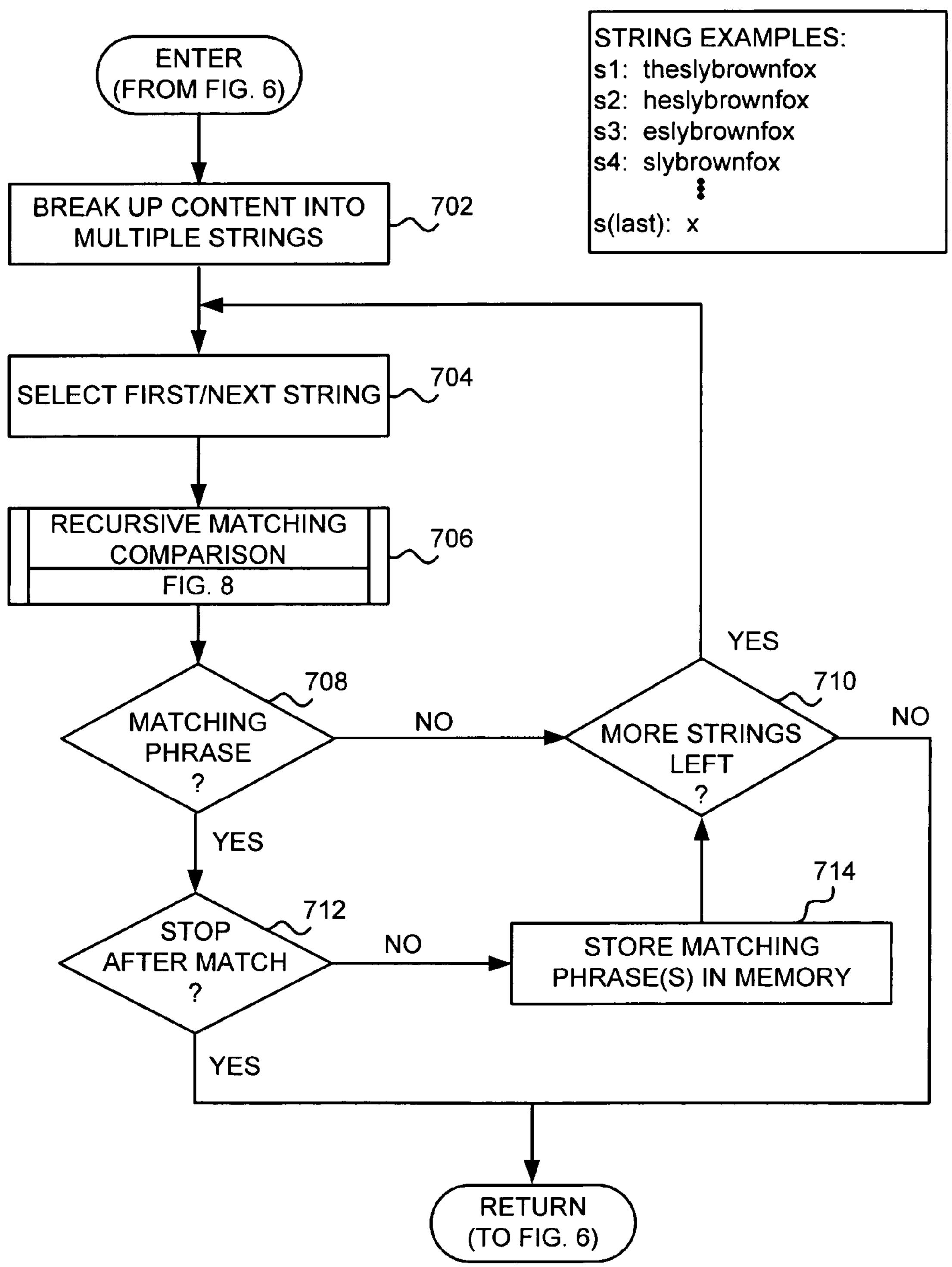
FIG. 7 shows a flow diagram illustrating the matching breakdown subroutine in an embodiment of the present invention.
Figure 8:
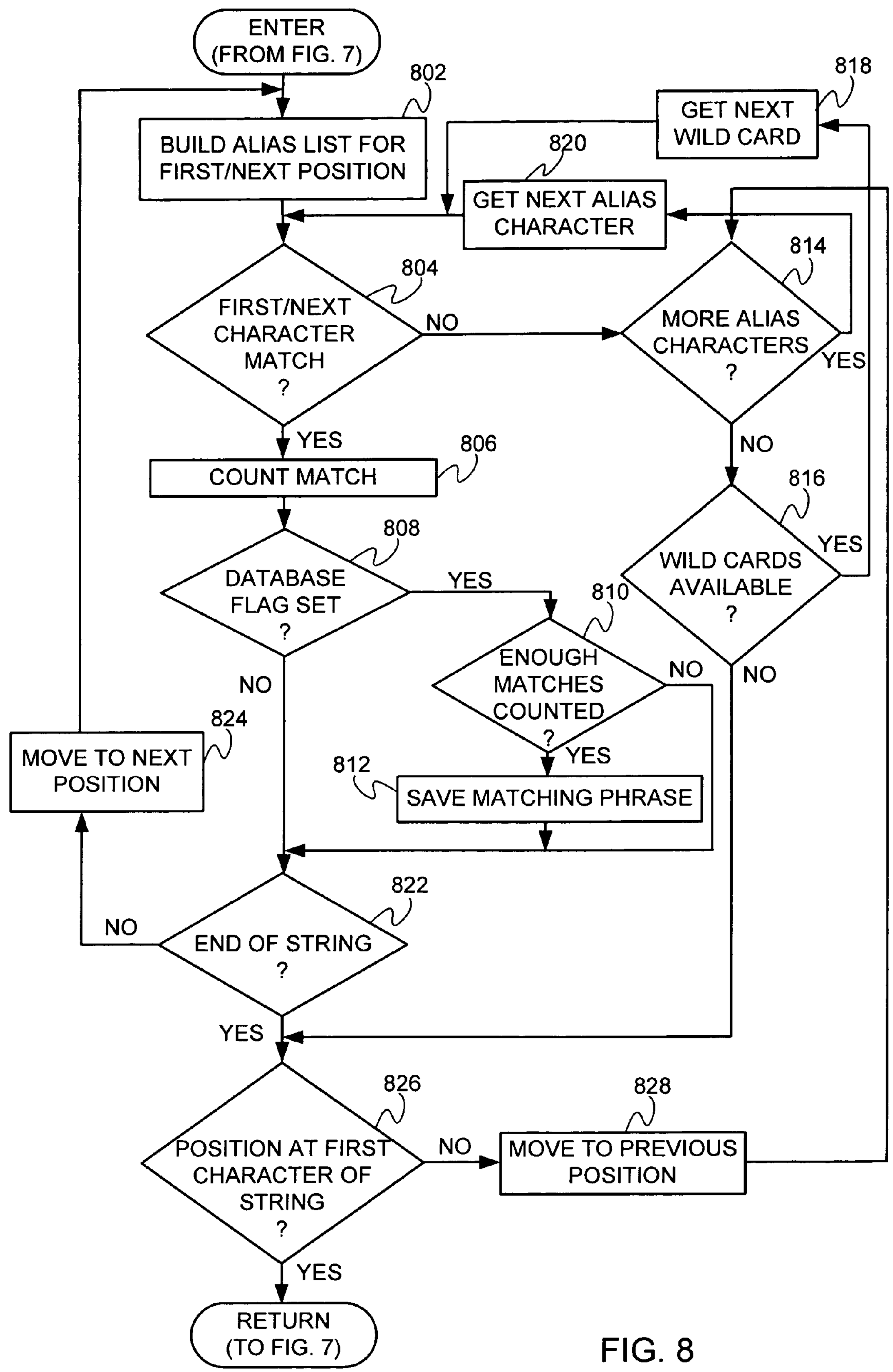
FIG. 8 shows a flow diagram illustrating the recursive matching comparison subroutine in an embodiment of the present invention.

The preprocessed Content is then passed in step 606 to the Matching Breakdown Subroutine of FIG. 7, which searches for undesirable Terms, and also calls the Recursive Matching Comparison subroutine of FIG. 8.

FIG. 7 shows a flow diagram illustrating the matching breakdown subroutine called from FIG. 6 in an embodiment of the present invention. Referring now to FIG. 7, the Matching Breakdown Subroutine is similar to the Content Breakdown Subroutine of FIG. 4, except that instead of sending a string beginning with each Word through the Recursive Comparison Subroutine of FIG. 5, the Matching Breakdown Subroutine sends a string beginning with each character through the Recursive Matching Comparison Subroutine of FIG. 8.

In the Matching Breakdown Subroutine, the Program in step 702 breaks up the Content into multiple strings (s1, s2, s3, s4, etc.) with each string beginning with each successive character in the Content, and passes these strings in successive order in step 704 to the Recursive Matching Comparison Subroutine of FIG. 8 in step 706. The string beginning with the first character is the first string passed to the Recursive Matching Comparison Subroutine in step 706.

In our example, the string 1.11, "theslybrownfox", is the first string, which is successively broken down into the subsequent strings of:

1.12 "heslybrownfox"

1.13 "eslybrownfox"

etc., with each successive string beginning with the next character, ending with the last string of:

1.14 "x"

The Program will take the string 1.11 (s-1) "theslybrownfox", and send it to the Recursive Matching Comparison Subroutine of FIG. 8 in step 706.

FIG. 8 shows a flow diagram illustrating the recursive matching comparison subroutine called from FIG. 7 in an embodiment of the present invention. Referring now to FIG. 8, the Recursive Matching Comparison Subroutine is similar to the Recursive Comparison Subroutine of FIG. 5, but instead of comparing the string of characters against all of the Terms in the Secondary Database of Undesirable Terms 904, the Recursive Matching Comparison Subroutine compares the strings against the "Matching" Terms in Database 902. Additionally, the comparison can be reversed with the "Matching" Terms in Database 902 being compared against the string of characters. In this reverse comparison, all of the steps above and below remain the same.

In terms of the major differences between the two recursive subroutines, the Recursive Matching Comparison Subroutine of FIG. 8 does not have an End of Word check (step 510 of the Recursive Comparison Subroutine of FIG. 5), and adds in the functionality of Wildcards and a Match Counter. The End of Word function is missing because the Recursive Matching Comparison Subroutine of FIG. 8 is not trying to find an exact word-for-word match, but is trying to find any possible sequence of characters similar to the "Matching" Terms. Wildcards are introduced to further this goal, enabling a match signal when the Content may be a few characters off of the actual "Matching" Term.

In step 802 the first character of the string is checked against the predefined "Alias Characters", which are stored in Database 902, to determine if there are any Alias Characters for the first character. If so, a temporary Alias Character List is built for the first character. Except as noted here, Alias Characters are identical to the description given above for Alias Characters in the discussion of the Blocking Subroutine of FIG. 2. The only difference in the Alias Character steps here is that, since any white space was deleted in step 604 of FIG. 6, there will be no spaces as Alias Characters.

To recap the Alias functions, if a character has Alias Characters, then the Program will build an Alias Character List in step 802. The character in the string is replaced with the first Alias Character. Next, the Program attempts to match the string with the first Alias Character to any of the "Matching" Terms. The Program then substitutes the next Alias Character in the list into the string, and runs the string again to attempt to match the string with the next Alias Character to any of the "Matching" Terms.

In our example, the string 1.11 "theslybrownfox", the letter "l" could be a representation of an exclamation point "!", the letter "i", the letter "l", or the number one "1". Assuming the defined order of these characters is "!", "i", "l", "1", and assuming that the first four characters were matches, the Program will first run the string "thes!ybrownfox", then when prompted, the Program will run the string "thesiybrownfox", and then again, when prompted, the string "theslybrown fox", then finally, when prompted, the string "thes1ybrownfox".

If Alias Characters are not present, the Program simply tries to match the original character against the Terms in Database 902. If Alias Characters are present, the Program changes the string as noted above, notes that it has started the progression for the Alias Characters and then runs through the remaining steps to determine if there are any "Bad" Terms.

Wildcards are introduced into the process to allow new permutations of "Matching" Terms to be found. Wildcards are accounted for by counting the number of actual matches between the string of characters and the "Matching" Terms. A certain number of character matches is required for the string to match a "Matching" Term. The number of character matches required in the sequence controls the number of matches found. A small number of character matches results in a wide net and many "Matching" Terms for the Sponsor to review. Requiring all of the characters to match may result in virtually no "Matching" Terms. Finding an acceptable medium will allow the Sponsor to catch most of the new undesirable "Matching" Terms being used, without spending inordinate amounts of time reviewing acceptable Content.

The number of character matches is controlled by either a percentage of the characters in a "Matching" Term or an absolute number of required character matches for a given number of characters in a Word. For example, if the percentage is set to 75% character match (and therefore 25% Wildcards), six letters of an eight letter word must be identical and in the correct sequence. Alternatively, a specific word length could be hard coded so that only five character matches in an eight letter word is allowable as a match. If the "Matching" Term is "Neopets", and five of seven characters are required to be a match, then "Neipats" and "Netbets" would match as would "Neobats" and "Neobeds".

In addition to matching any character, a Wildcard can take the place of an absent character (to expand the string). For example, if "Neopets" was a "Matching" Term with two Wildcards allowed, then "Neopt" would match, using two Wildcards to expand the string to "Neop*t*". A Wildcard is represented by the asterisk character "*".

A Wildcard can also be used to match a void (to contract the string). For example, if "Neopets" was a "Matching" Term with two Wildcards allowed, then "Nudeopets" would match, using two Wildcards to contract the string to "N**eopets".

As another example, if the string being examined is "Nzezozpzeztzs", and the "Matching" Term is "Neopets", the first character position in the string is a match to the first character position in the "Matching" Term ("N" and "N"). The next characters, the "z" and the "e" do not match, so a Wildcard is used. Using the Wildcard function that contracts the string, the next string to be run will be "Nezozpzeztzs" (dropping the "z"). Since the next character is now a match ("e" and "e"), it will be counted as a match and advance to the next position. The Program will continue in this manner until the Program gets rid of the succeeding "z"'s and finds the match of "Neopets".

Limitations can also be set in the Program on whether or not the string is expanded or a void position will be checked. Usually, the Program will only expand a given position once before moving to the next function. Additionally, the void position is usually not tested when the Program is checking the first character of the string. To accomplish these functions, the Wildcard function will act similarly to the Alias function by testing all three possibilities in sequence and running the recursion on each of them.

For example, if the string being examined is "Neopsss", and the "Matching" Term is "Neopets", and two Wildcards are allowed, the first four letters in the string will be a match to the "Matching" Term. The next characters, the "s" and the "e", do not match, so a Wildcard is used. The Wildcard is like the Alias Character in that first "Neopss" will be run (contracting the string), then "Neop*ss" will be run (replacing the character), and finally "Neop*sss" will be run (expanding the string).

If a Wildcard is used in a position, it will be considered a match against any character, but will not be counted as a match by the Match Counter because it is a Wildcard. The Program keeps track of what options have been run.

After building the Alias Character List in step 802, the Program in step 804 compares the first character in the string against the first character of the "Matching" Terms. If step 804 determines that there is a match to one or more "Matching" Terms in Database 902, then the Program will count the match in step 806 as one needed toward the total to find a Matching Phrase in the Content, as described above in the Wildcard section and as described further below.

As noted above, a Wildcard is not counted as a match. The following three situations are considered matches. First, if the Content entering the Recursive Matching Comparison Subroutine contains a wild character (certain characters can be designated as wild characters, which are generally characters that are often used to replace any letter, such as the asterisk character "*", which is to be distinguished from the replacement of an incoming character with a Wildcard, as described above) indicating that any character in the "Matching" Term will match the character in the Content. Second, if the incoming Content contains a character (or Alias Character) that exactly matches a character in the same position (including as modified by Wildcards as discussed above) in a "Matching" Term. Third, if the "Matching" Term contains a wild character, then any character in the incoming Content in the same position will be considered a match. These same situations will also count as a match in the Blocking Subroutine of FIG. 2 as well.

In our example, the string 1.11 "theslybrownfox", when the Program begins in step 804 the first character that is checked is the letter "t". The letter "t" would be considered a match if the "Matching" Term contained a "t" or a wild character.

The Program may also convert the number of matches counted to a "fudge" factor at the option of the Sponsor. The Program does this by subtracting the counted matches from the current position of the string. The fudge factor can be used in place of, or in addition to, the number of matches to define when the Program finds a match. For example, instead of requiring five characters of an eight character string to match, the Program could be directed by the Sponsor to find a match when there are only three fudges in an eight string character. Fudge matches are "virtual wildcards" allowing new substitutions to be detected. For example, if "Sly Fox" is in the database and a User enters "Sty Fox", at this point the process could make an assumption that "t"="l" and pass the results on for human verification. There is a limit placed on the number of fudges available otherwise the number of false matches gets very huge. Wildcard characters subtract from the number of fudges available. The Program could also be directed to find a match if there are no more than three fudges and more than four exact matches in an eight character string. Thus there are three categories of matches possible: fudge, wildcard, and exact.

After the Program counts the match in step 806, the Program determines if a flag has been set in the "Matching" Term(s) in Database 902 in step 808. A flag is set in the "Matching" Terms at the end of a Term. If a flag is set in the current position, then the Program checks in step 810 to see if the Program has counted enough matches to consider the phrase a match. If enough matches have been counted (characters equaling a set percentage of the length of a "Matching" Term, or a set number of characters for a given length of the "Matching" Term) then the Program saves the string of Content as originally entered as a Matching Phrase in step 812. If at a later time the Program finds another match, then this later match will be saved in addition to the earlier match.

In our example, if the "Matching" Term was "thefly", and the string is 1.11 "theslybrownfox", and assuming that five of six characters are needed for a match, the Program would first determine that the first three characters of the Content matched the "Matching" Term. The fourth character however does not match in step 804 ("f" and "s"). Therefore, the Program would check for Alias Characters in step 814 for the letter "f" and, finding none, would then check for any Wildcards that are available in step 816. The first Wildcard obtained in step 818 would delete the current character "f" and test the string "thelybrownfox". Further permutations of the "thelybrownfox" would not meet the five of six character requirement. The Program returns to this position and tries the next Wildcard permutation, the string "the*lybrownfox" in step 818. When the Program examines the string "the*lybrownfox", the Wildcard "*" will match the "f" but will not be counted as a match. The Program will then continue and find that the next two characters ("l" and "y") are matches in step 804, then count the matches in step 806, and then find that the flag is set in the database at the end of the "y" in "thefly" in step 808. At this point, there have been six matches, five of which were counted. The one Wildcard was not counted. Since the five of six matches is the criteria needed for this six letter "Matching" Term as determined in step 810, the string will be saved as a Matching Phrase in step 812, and the Program will continue checking the rest of the string for other matches. If not enough matches have been counted as determined in step 810, then the Content is not saved.

After saving a Matching Phrase in step 812, or finding that a phrase does not match in step 810, or if a flag is not set in the current position of a "Matching" Term in Database 902 in step 808, the Program will determine if it has reached the end of the string in step 822. If it has not, in step 824 the Program will call itself recursively and move to the next position of the string and build an Alias Character List for that position in step 802. The Program will continue searching through the string for Matching Phrases until step 822 determines that the end of the string has been reached through stepping back up the recursion levels. Once at the end of the string, it will then begin regressing back to the beginning of the string.

Regressing back to the beginning of the string is similar to the regression of the Recursive Comparison Subroutine of FIG. 5. If step 826 determines that the Program is not pointing to the first string position, then in step 828 the Program steps back up a level in the recursion to the previous position and step 814 determines if there are more Alias Characters, and if not, step 816 determines if there are more Wildcards available. The process of working through the Alias Characters and the Wildcards is described more fully below. When all of the Alias Characters and Wildcards have been exhausted and the Program returns to the first string position as determined in step 826, control returns to the Matching Breakdown Subroutine of FIG. 7 with any Matching Phrases that have been saved in step 812.

For example, if the string being examined is “Neopsss”, and the “Matching” Term is “Neopets”, and two Wildcards are allowable, the first four letters in the string will be a match. The next letter “s” does not match “e” (step 804), and does not have any Alias Characters (step 814). The Wildcards will then be run (step 816), first contracting the string to “Neopss” (step 818), which will not work, and then replacing the “s” with a Wildcard to give “Neop*ss” (step 816 and step 818). This will match (step 804), but will not be counted as a match (step 806) and go on to the next character (steps 808, 822, 824, and 802), which again is the letter “s”. This “s” does not match the “t” in the “Matching” Term (804), the Wildcard process will run as recounted above, and will eventually test the string “Neops”, replacing the first letter “s” and the second letter “s” with Wildcards (steps 816 and 818). The second Wildcard will match (step 804) but again will not be counted as a match (step 806), and the Program will advance to the next character (steps 808, 822, 824, and 802), which is “s” which matches the “s” in the “Matching” Term (step 804) and is counted as a match (step 806). Since the “s” is at the end of “Neopets”, the Program will then encounter a database flag (step 808), and check to see if enough matches have been counted (step 810). Since five of seven matches have been made, which meets the criteria needed for a match in our example, the Program will save the Matching Phrase (step 812**) and continue checking for more Matching Phrases.

If, after building an Alias Character List (step 802), the Program determines that the first character is not a match to the first character of any of the “Matching” Terms (step 804), then the Program determines if any more Alias Characters are left to run (step 814). If yes, the Program replaces the first character of the string with the next Alias Character in sequence in step 820 and checks the first character of the new string against the first character of the “Matching” Terms to attempt to find a match (step 804). Assuming that there are no matches (step 804), and that no more Alias Characters are available (step 814), the Program then tests Wildcards (step 816).

As discussed above, the Wildcard can be a void, any character, or an extra character. The first Wildcard contracts the string (step 818) and runs the permutations of a void to try to find a match. If no matches are found, then the character is replaced with a Wildcard and the Program again runs the permutations of the Wildcard (step 818) to try to find a match. Again, if no matches are found, then the Program will expand the string with a Wildcard (step 818) and try again to find any matches.

Once the Wildcards are used up in a particular position as determined in step 816, the Program then determines if it is in the first string position in step 826. As in the Recursive Comparison Subroutine of FIG. 5, the string position refers to the order of characters of the current string, and the Program only compares characters of the string and the “Matching” Terms if those characters are in the same or equal positions.

If step 826 determines that the Program is not at the first string position, the Program in step 828 steps back up a level in the recursion to the previous position and again determines in step 814 if any Alias Characters are left in that position. If Alias Characters are left to be checked in that position, then, as above, the Program in step 820 will move to the next Alias Character and compare it to the database to determine a match (step 804).

If step 814 determines there are no more Alias Characters left for comparison in that position, the Program in step 816 will determine if all of the Wildcard permutations in that position have been used. If more Wildcards are available, the Program will get the next Wildcard in step 818 as above to try to find a match (step 804).

If step 816 determines that there are no more Wildcards left, the Program will again determine if it is at the first position in the string (step 826). If it is not in the first position, the Program will continue to regress to the first position while checking for Alias Characters and Wildcards that have not been compared against “Matching” Terms in Database 902 as described above. When the Program reaches the first position, it returns to the Matching Breakdown Subroutine of FIG. 7 with the Matching Phrases that have been saved, if any, in step 812.

In our example, for string 1.11 “theslybrownfox”, and the “Matching” Term is “theme”, and one Wildcard is allowable, the first three letters will be a match. The next letter in our string, “s”, does not match “m” (step 804), and in our example does not have any Alias Characters (step 814). The Wildcards will then be run (step 816), first contracting the string to “thelybrownfox” (step 818), which will not work, then replacing the “s” with a Wildcard to give “the*lybrownfox” (step 818). This will match (step 804), but will not be counted as a match (step 806). Since the database flag is not set on the “m” of “theme”, but at the last “e” (step 808), and the end of the string has not been encountered (step 822) the Program will go on to the next character (step 802).

This next character in the string, “l”, does not match the “e” (step 804), and assuming there are no Alias Characters for “l” (step 814), the Wildcard process will run as above (step 816), trying “the*ybrownfox” (contracting the string by deleting the “l”, step 818) which will not work, and then trying “theybrownfox” (step 818). This will be a match (step 804), but will not be counted as a match (step 806) since it is a Wildcard. The Program will then encounter the database flag at the end of “theme” (step 808) and check to see if there are enough characters for a match (step 810). Since we only have three matches, and four are required, the Program will not save anything and will continue checking the rest of the string (steps 822, 824**).

Since the Program has passed the end of the “Matching” Term in the database, the Program will not encounter any more matches (step 804) except for Wildcard matches, since there are no more characters to match in the “Matching” Term. The Program will continue checking Wildcards until it reaches the end of the string (step 822) and starts regressing back to the fist position (step 826), checking for any unused Alias Characters (step 814) and Wildcards (step 816). When the Program reaches the first position of the string (step 826), the Program will return to the Content Breakdown Subroutine of FIG. 7.

Returning now to FIG. 7, step 708 determines if the Recursive Matching Comparison Subroutine of FIG. 8 has returned a Matching Phrase. If no Matching Phrase has been returned, the Program in step 710 determines if the program is pointing to the last string (s-last), that is, has the last string been processed through the Recursive Matching Comparison Subroutine. If no more strings are left, then control returns to the Matching Subroutine of FIG. 6. If the Program is not pointing to the last string in step 710, then the Program will advance to the next string (s2, s3, etc.) in step 704 and call in step 706 the Matching Comparison Subroutine of FIG. 8 again, sending a string of characters beginning with the new character to search for Matching Phrases.

In our example, the first string 1.11 (s1) of Content "theslybrownfox" that was sent through the Program was the string beginning with the first character. The second character is "h", and the second string 1.12 (s2) is "heslybrownfox". The third character is "e" and the third string 1.13 (s3) is "eslybrownfox". The fourth character is "s" and the fourth string 1.14 (s4) is "slybrownfox". The Program will continue similarly through the Content to the last character, "x", which is last string 1.14 (s-last) "x".

Assuming no Matching Phrases are found, the Program will continue advancing through the characters in the Content and send strings beginning with those characters through the Recursive Matching Comparison Subroutine of FIG. 3. Once no characters are left in the Content to test, then the Program will return to the Matching Subroutine of FIG. 6 with no Matching Phrases.

If, however, step 708 determines that the Recursive Matching Comparison Subroutine of FIG. 8 has found a Matching Phrase, then the Program will determine if the Sponsor has selected the option to look for only one Matching Phrase in step 712. If yes, the Program will stop and return to the Matching Subroutine of FIG. 6 with the Matching Phrase. If step 712 determines that the Sponsor has selected the option to have the Program look for more than one Matching Phrase, the Program will store the Matching Phrase in memory in step 714 and control flows to step 710, which determines if there are any more strings left to test in the Content. If so, it will continue to run strings through the Recursive Matching Comparison Subroutine of FIG. 8 as described above. If step 708 determines that any other Matching Phrases are returned from FIG. 8, the Program will store the additional Matching Phrases in memory with any others already found in step 714. When the Program determines that it has tested the last string with the last character in the Content in step 710, control returns to FIG. 6 along with all the Matching Phrases that have been stored in step 714.

Returning now to FIG. 6, if Matching Phrases are not retuned to the Matching Subroutine as determined in step 608, control returns to FIG. 1. If step 608 determines that one or more Matching Phrases are returned, then the Program starts with the first saved Matching Phrase in step 610 and attempts to put the phrase in Database 902 as a "Not Reviewed" Term. Step 610 determines if the phrase is already in the database (as a Term in any category). If the phrase is not in database 902, then in step 612 the Matching Phrase will be entered into the database as a "Not Reviewed" Term. Then, step 614 determines if there are more phrases left to check. If so, then control returns to step 610 where the next Matching Phrase is checked against Database 902. If step 610 determines that the phrase is already in Database 902, then control flows to step 614 to check for more Matching Phrases. After all Matching Phrases have been checked, the contents of each HTML tag are submitted for processing to the Matching Subroutine.

FIG. 10-13 show representations of exemplary screen shots of Web pages delivered by a server computer that may be displayed through a Web browser on a display device of a client computer or a user computer of the system and method of filtering website content in an embodiment of the present invention. Referring now to FIGS. 10-13, FIG. 10A shows an example of a user attempting to send an email with inappropriate Content through a Communication Forum of the Sponsor. The user has navigated through a Web browser on a client computer to Email Web Page 1000, which enables the user to send an email message. In Message Window 1002 the user has typed in an inappropriate word. In other cases, the inappropriate Content may be contained within a phrase, or the entire phrase may be inappropriate. Upon clicking on Send Button 1004, the system of the present invention intercepts the email message, evaluates the content, and finds the objectionable Content. FIG. 10B shows an "Input Blocked" Web page that is returned to the user's Web browser. Input Blocked Web Page 1006 has Graphic 1008, and Text Message 1010. Text Message 1010 contains the predetermined message that the Sponsor wants to communicate to the user regarding posting unacceptable Content, and may be worded in a number of different ways. Back Button 1012 allows the user to return to Email Web Page 1000 where the user can edit the message and try to resend it, or quit.

Figure 11A:
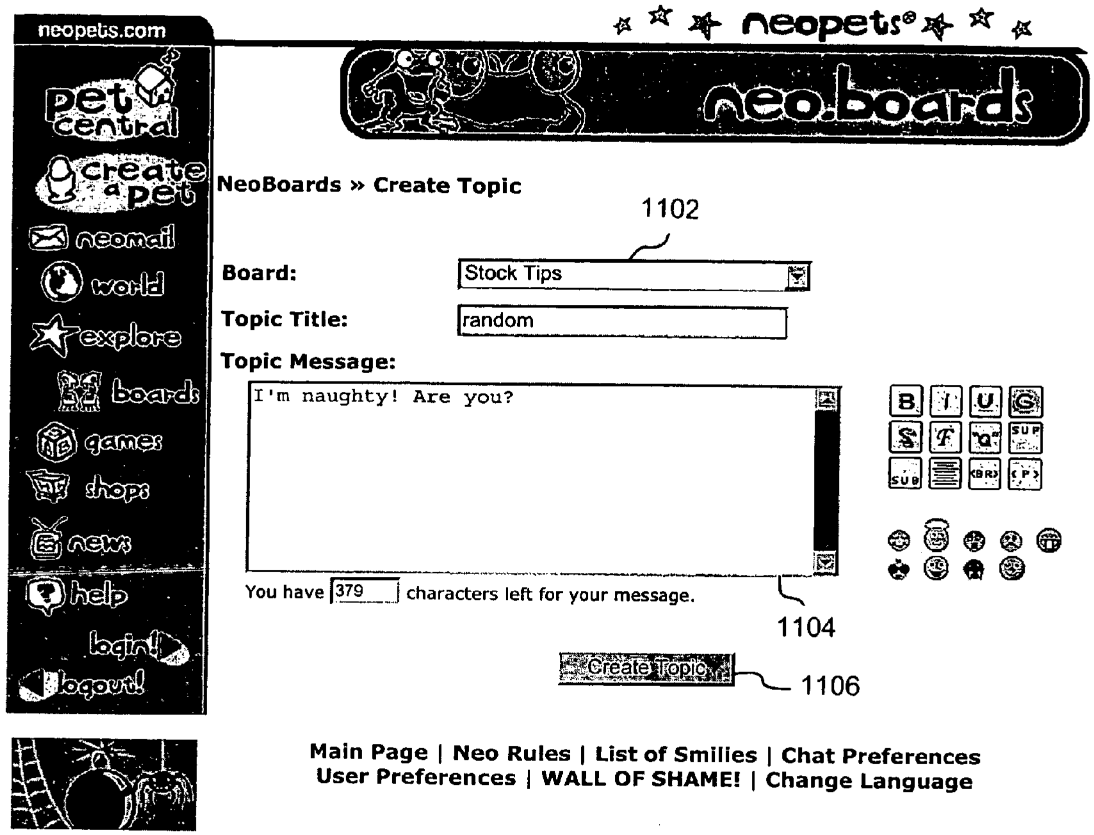
FIG. 11A shows an exemplary screen shot of a user attempting to post a topic on a message board with inappropriate content.

FIG. 11A shows another example of a user attempting to send an email with inappropriate Content through a Communication Forum of the Sponsor. The user has navigated through a Web browser on a client computer to Message Board Web Page 1100, which enables the user to post a topic. The user has selected a particular message board through Entry Box 1102. In Message Window 1104 the user has typed in an inappropriate message for posting to the particular message board. Upon clicking on Create Topic Button 1106, New Topic Web Page 1108 shown in FIG. 11B is returned to the Web browser of the user's client computer. The system of the present invention intercepts the input Content (which is the phrase "I'm naughty! Are you?"), evaluates the Content, and finds the word "naughty" to be objectionable, and replaces the word "naughty" with an acceptable Term designated by the Sponsor, which in this example is the word "boring".

FIG. 11C shows the replaced Content that is viewed by a different user who has navigated through the Sponsor's Website to the Altered New Topic Web Page 1110. The altered Content can be seen in Message Window 1112. In this example, the Sponsor did not select the option to inform the user of the replaced text. If the option had been selected, then a Web page would have been returned to the user similar to Input Blocked Web Page 1006. The text of the message may show the user the replaced text, or just inform the user that some of the text has been replaced for being inappropriate Content.

FIG. 12 shows the Sponsor Interface Web Page 1200 that the Sponsor may access to review "Not Reviewed" Terms. Upon reviewing a Term, the Sponsor may designate a category for the Term reviewed ("Bad", "OK", "Hack", "TBD") or select the "Delete" option to remove the Term from the list, by clicking on the appropriate Radio Buttons 1202. The default category is "OK".

Figure 13:
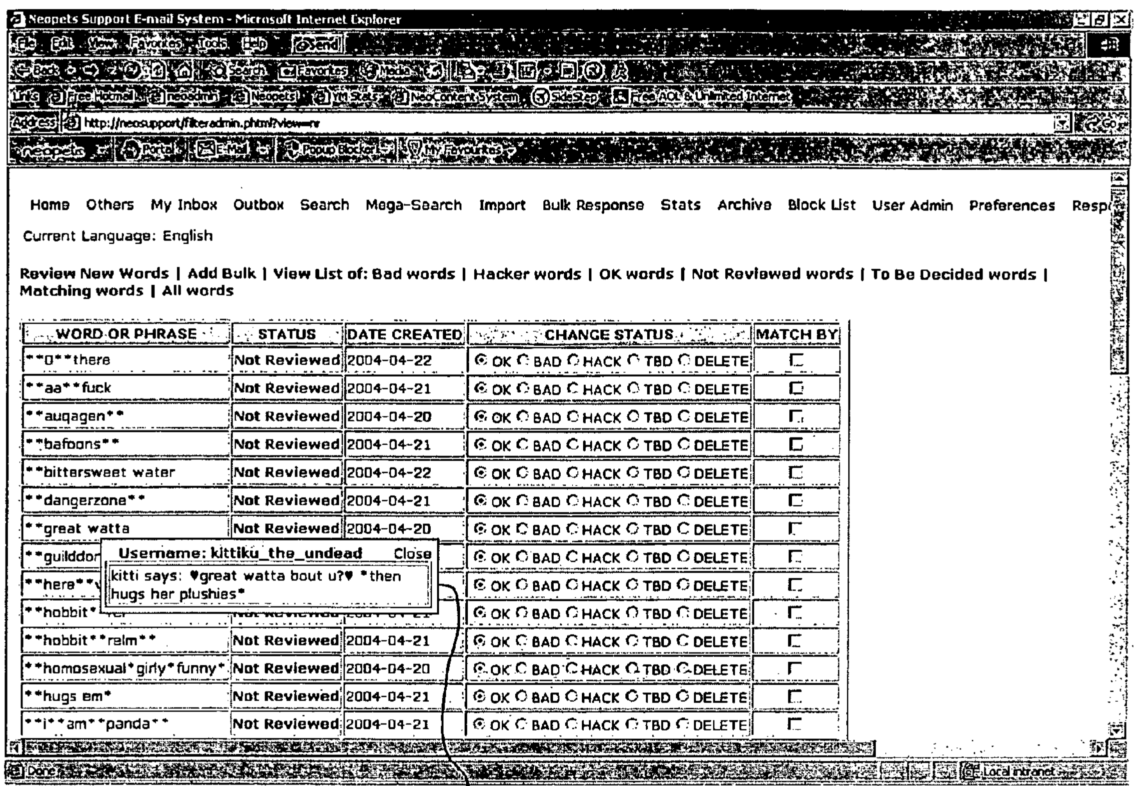
FIG. 13 shows an exemplary screen shot of a pop up box showing the content in which a term selected from FIG. 12 was used.

Placing the mouse cursor over the Term in the Word Or Phrase column displays the Content in which the Term was used, so the Sponsor can understand the context for the Term. This is shown in FIG. 13 in Pop Up Box 1302. The user name of the User submitting the Content is shown. After choosing a category for a Term, the Content is discarded.

Left clicking on the Term or User ID brings up a new Web page (not shown) for site administrative functions and information on the User account that posted the Content so that the Sponsor may warn, freeze, suspend, or take other action against a User. Once reviewed and entered into the Database, Terms can be reviewed through a search by Term or by Category of Term in Search Box 1204, or by User Name in Search Box 1206. While viewing Terms shown by the search, the Sponsor can add, delete, or change the category of a Term. The Sponsor can also add a word or phrase in Add Word Or Phrase Box 1208.

Having described the present invention, it will be understood by those skilled in the art that many changes in construction and widely differing embodiments and applications of the invention will suggest themselves without departing from the scope of the present invention.

What is claimed is:

1. A computer implemented method for filtering content submitted by a user for dissemination over a communication forum, the method comprising the steps of:

(a) intercepting the content submitted by the user at the time of submission by the user to the communication forum;

(b) preprocessing a copy of said intercepted content through a preprocessing subroutine to yield a modified content by reducing said intercepted content to its least common denominator, wherein said preprocessing step further comprises the steps of:

(b1) analyzing said intercepted content for HTML tags, wherein when there are no HTML tags, performing steps (b2) through (b7), and when there are HTML tags, performing steps (b8) through (b12);

(b2) converting each white space to a space, wherein said white space is a one of a space, a tab, a return, an end of line character, and any other character that is displayed on a display device as said white space to a viewer;

(b3) removing each punctuation character at an end of a word, wherein said word is a string of characters;

(b4) converting each uppercase letter into a corresponding lowercase letter;

(b5) performing a character mapping on the results of said steps (b2), (b3), and (b4) of the intercepted content;

(b6) utilizing the results of said step (b5), changing a three or more of any consecutively repeated character to two of said consecutively repeated character or to a one of said consecutively repeated character based upon a predefined list; and (b7) deleting any remaining spaces at the end of said intercepted content;

(b8) separating said HTML tags from a non-HTML text of said intercepted (b9) concatenating said non-HTML text with a space where said HTML tag was located in said intercepted content;

(b10) sending said concatenated non-HTML text to said converting step (b2) for continued processing;

(b11) copying a text inside said HTML tags to a file; and (b12) processing said text inside each said HTML tags through steps (b2), (b4), and (b7);

(c) breaking said modified content down through a content breakdown subroutine into a plurality of strings of words, wherein each successive string of words drops the first word from the previous string of words;

(d) processing each of said plurality of strings of words through a recursive comparison subroutine to attempt to identify at least one undesirable term that matches a previously identified undesirable term stored in a secondary database of undesirable terms, wherein each of said previously identified undesirable terms is a word or a phrase; and (e) when said at least one undesirable term is identified, blocking the content submitted by the user to the communication forum from appearing on the communication forum.

2. A computer implemented method according to claim 1 wherein performing a character mapping step (b5) further comprises the steps of:

(b5a) finding each character or a string of characters having a one-to-one relationship with a predetermined phonetic or symbolic character, wherein each said character or said string of characters having said one-to-one relationship is replaced with its said predetermined phonetic or symbolic character;

(b5b) replacing each remaining non-replaced numeric character with a zero; and (b5c) replacing each remaining non-replaced predetermined non-numeric character and each remaining non-replaced predetermined non-alphabetic character with an asterisk.

3. A computer implemented method according to claim 1 wherein processing step (d) further comprises the steps of:

(d1) checking a first character of a first of said plurality of strings of words against a predefined alias character list, wherein each of said alias characters is a predefined character mapping where more than one character in an ordered sequence is mapped to a single character;

(d2) when a match is found in said step (d1) for said first character of a first word of said first plurality of strings of words, building a temporary alias list for said first character;

(d3) comparing said first character against a first character of all said previously identified undesirable terms in said secondary database of undesirable terms for a match;

(d4) when a match is found, checking to see if said first character is at an end of said first word;

(d5) when said first character is not at said end of said first word, calling, by said recursive comparison subroutine, said recursive comparison subroutine recursively;

(d6) moving to a next character in said first word of said first plurality of strings of words;

(d7) repeating steps (d1) through (d6) for said next character;

(d8) repeating step (d7) for each remaining character in said first word of said first plurality of strings of words;

(d9) repeating steps (d1) through (d8) for each next word in said first of said plurality of strings of words; and (d10) repeating steps (d1) through (d9) for the remaining plurality of strings of words.

4. A computer implemented method according to claim 3 wherein building step (d2) further comprises the steps of:

(d2a) when a match is not found for said first character of a first word of said first plurality of strings of words, determining if there are any of said alias characters left for said first character of said first word;

(d2b) when said determining step (d2a) result is yes, replacing said first character of said first word with a next alias character in said ordered sequence and passing control to said comparing step (d3) for continued processing;

(d2c) when said determining step (d2a) result is no, determining if said recursive comparison subroutine is pointing to said first character of said first word of said first plurality of strings of words on its way back up from said recursion;

(d2d) when said determining step (d2c) result is no, stepping back up a level recursively to a previous character position and passing control to said determining step (d2a) for continued processing;

(d2e) when said determining step (d2c) result is yes, returning any said at least one undesirable terms found to said blocking step (e).

5. A computer implemented method according to claim 4 wherein checking step (d4) further comprises the steps of:

(d4a) when said first character is at an end of said first word, determining if a flag has been set in said secondary database of undesirable terms, wherein said flag is set at an end of each of said previously identified undesirable terms;

(d4b) when said determining step (d4a) result is yes, indicating that said first word matches a one of said previously identified undesirable terms, saving into a memory said first word as said at least one undesirable term, and passing control to step (d4c);

(d4c) when said determining step (d4a) result is no, or after said saving step (d4b), determining if said recursive comparison subroutine has reached an end of said first of said plurality of strings of words;

(d4d) when said determining step (d4c) result is no, passing control to said calling step (d5) for continued processing; and (d4e) when said determining step (d4c) result is yes, passing control to step (d2c).

6. A computer implemented method according to claim 5 wherein returning step (d2e) further comprises the steps of:

(d2e1) when any said at least one undesirable terms are returned from said recursive comparison subroutine, determining if a replacement option has been selected;

(d2e2) when said determining step (d2e1) result is yes, checking a database for a replacement term for any of said at least one undesirable terms;

(d2e3) when said determining step (d2e1) result is no, passing control to step (d2e5);

(d2e4) when said determining step (d2e2) result is yes, replacing any of said at least one undesirable terms with said replacement terms in the content yielding a replacement string;

(d2e5) when said determining step (d2e2) result is no, storing any of said at least one undesirable terms in said memory;

(d2e6) determining if a search for another match option has been selected;

(d2e7) when said determining step (d2e6) result is no, determining if there are any words left to test in said first plurality of strings of words;

(d2e8) when said determining step (d2e6) result is yes, passing control to said blocking step (e);

(d2e9) when said determining step (d2e7) result is no, passing control to said blocking step (e); and (d2e10) when said determining step (d2e7) result is yes, returning any said at least one undesirable terms and any said replacement string to said processing step (d).

7. A computer implemented method according to claim 6 further comprising the steps of:

(d2e11) when any said at least one undesirable terms are not returned from said recursive comparison subroutine, passing control to said step (d2e7); and (d2e12) when said determining step (d2e7) result is no, passing control to said blocking step (e) with an OK indication.

8. A computer implemented method according to claim 7 wherein blocking step (e) further comprises the steps of:

(e1) when no said at least one undesirable terms have been returned from said processing step (d), determining if any said OK indication or any said replacement string has been returned;

(e2) when said determining step (e1) result is said OK indication, posting the content to the communication forum;

(e3) when said determining step (e1) result is said replacement string, replacing all or part of the content with said replacement string yielding an altered content;

(e4) determining if a notify user option has been selected;

(e5) when said determining step (e4) result is yes, notifying the user that all or part of the content has been replaced;

(e6) posting said altered content to the communication forum; and (e7) when said determining step (e4) result is no, posting said altered content to the communication forum without notifying the user.

9. A computer implemented method for filtering content submitted by a user for dissemination over a communication forum, the method comprising the steps of:

(a) intercepting the content submitted by the user at the time of submission by the user to the communication forum;

(b) preprocessing a copy of said intercepted content through a preprocessing subroutine to yield a modified content by reducing said intercepted content to its least common denominator;

(c) breaking said modified content down through a content breakdown subroutine into a plurality of strings of words, wherein each successive string of words drops the first word from the previous string of words;

(d) processing each of said plurality of strings of words through a recursive comparison subroutine to attempt to identify at least one undesirable term that matches a previously identified undesirable term stored in a secondary database of undesirable terms, wherein each of said previously identified undesirable terms is a word or a phrase;

(e) when said at least one undesirable term is identified, blocking the content submitted by the user to the communication forum from appearing on the communication forum;

(f) storing in a file the content intercepted from the user, a user ID for the user, and any OK indications, any undesirable terms, and any replacement string resulting from preprocessing step (b), breaking step (c), and processing step (d);

(g) processing said intercepted content through a matching subroutine to identify new permutations of undesirable terms, wherein said processing said intercepted content step further comprises the steps of:

(g1) repeating preprocessing step (b) for said intercepted content:

(g2) removing any white space from said intercepted content remaining after said preprocessing step (b);

(g3) processing said intercepted content through a matching breakdown subroutine to attempt to identify at least one matching phrase;

(g4) when said at least one matching phrase has been identified, determining if a first of said at least one matching phrase is already stored in a database of terms;

(g5) when said determining step (g4) result is yes, passing control to said determining step (g7) for continued processing;

(g6) when said determining step (g4) result is no, entering said at least one matching phrase into said database of terms as a not reviewed term;

(g7) determining if there is a next said at least one matching phrase;

(g8) when said determining step (g7) result is yes, passing control to said determining step (g4) for said next said at least one matching phrase; and (g9) when said determining step (g7) result is no, passing control to said erasing step (h); and (h) erasing said file.

10. A computer implemented method according to claim 9 wherein step (g6) further comprises reviewing said not reviewed term and designating a category for said not reviewed term.

11. A computer implemented method according to claim 9 wherein processing step (g3) further comprises the steps of:

(g3a) breaking the content up into a plurality of strings, wherein each successive one of said plurality of strings begins with a successive character of the content;

(g3b) processing a first of said plurality of strings through a recursive matching comparison subroutine to attempt to identify said at least one matching phrase that is similar to a one of said previously identified undesirable terms stored in said secondary database of undesirable terms;

(g3c) determining if said at least one matching phrase has been identified in said first of said plurality of strings;

(g3d) when said determining step (g3c) result is no, determining if there are more of said plurality of strings to be processed;

(g3e) when said determining step (g3d) result is yes, passing control to said processing step (g3b) for a next of said plurality of strings;

(g3f) when said determining step (g3d) result is no, passing control to said determining step (g4);

(g3g) when said determining step (g3c) result is yes, determining if an option to look for only a one of said at least one matching phrase has been selected;

(g3h) when said determining step (g3g) result is no, storing said at least one matching phrase in a memory and passing control to said determining step (g3d); and (g3i) when said determining step (g3g) result is yes, passing control to said determining step (g4).

12. A computer implemented method according to claim 11 wherein processing step (g3b) further comprises the steps of:

(g3b1) checking a first character of a first of said plurality of strings against a predefined alias character list, wherein each of said alias characters is a predefined character mapping where more than one character in an ordered sequence is mapped to a single character;

(g3b2) when a match is found in said step (g3b1) for said first character of said first of said plurality of strings, building a temporary alias character list for said first character;

(g3b3) comparing said first character against a first character of all said previously identified undesirable terms in said secondary database of undesirable terms for a match;

(g3b4) when a match is found, counting the match toward a predetermined total of counted matches needed to identify said at least one matching phrase;

(g3b5) for said match, determining if a flag has been set in a current position of said previously identified undesirable term in said secondary database of undesirable terms, indicating an end of said previously identified undesirable term;

(g3b6) when said determining step (g3b5) result is no, passing control to step (g3b10);

(g3b7) when said determining step (g3b5) result is yes, determining if a total of said counted matches is equal to said predetermined total of counted matches needed to identify said at least one matching phrase;

(g3b8) when said determining step (g3b7) result is yes, saving said first of said plurality of strings as said at least one matching phrase;

(g3b9) when said determining step (g3b7) result is no, passing control to step (g3b10);

(g3b10) determining if said recursive matching comparison subroutine has reached an end of said first of said plurality of strings;

(g3b11) when said determining step (g3b10) result is no, calling, by said recursive matching comparison subroutine, said recursive matching comparison subroutine recursively;

(g3b12) moving to a next character in said first of said plurality of strings and passing control to said checking step (g3b1) for said next character;

(g3b13) repeating steps (g3b1) through (g3b12) for said next character; and (g3b14) repeating step (g3b13) for each remaining character in said first of said plurality of strings.

13. A computer implemented method according to claim 12 wherein step (g3b7) further comprises requiring said predetermined total of counted matches to be a percentage of the total number of characters in said previously identified undesirable term to identify said at least one matching term.

14. A computer implemented method according to claim 12 wherein step (g3b7) further comprises requiring said predetermined total of counted matches to be a hard coded number that is based upon the total number of characters in said previously identified undesirable term, said hard coded number being less than or equal to the number of characters in said previously identified undesirable term, in order to identify said at least one matching term.

15. A computer implemented method according to claim 12 wherein comparing step (g3b3) further comprises the steps of:

(g3b3a) when a match is not found, determining if there are any said alias characters in said temporary alias character list left to be used for comparison in place of said first character;

(g3b3b) when said determining step (g3b3a) result is yes, replacing said first character with a first alias character in said temporary alias character list and passing control to said comparing step (g3b3) for said first alias character;

(g3b3c) when said determining step (g3b3a) result is no, determining if there are any wildcards left to substitute for said first character; and (g3b3d) when said determining step (g3b3c) result is yes, replacing said first character with said wildcard and passing control to said comparing step (g3b3).

16. A computer implemented method according to claim 15 wherein step (g3b3c) further comprises requiring said wildcard to be used for said first character in said first of said plurality of strings for at least a one of replacing said first character when there is not a direct match, taking the place of an absent character to expand said first of said plurality of strings, and matching a void to contract said first of said plurality of strings.

17. A computer implemented method according to claim 15 wherein determining step (g3b10) further comprises the steps of:

(g3b10a) when said determining step (g3b3c) result is no, passing control to step (g3b10b);

(g3b10b) when said determining step (g3b10) result is yes, determining if said recursive matching comparison subroutine is pointing to said first string position;

(g3b10c) when said determining step (g3b10b) result is no, stepping back up a level recursively to a previous character position and returning to said determining step (g3b3a) for continued processing;

(g3b10d) when said determining step (g3b10b) result is yes, passing control to said determining step (g3c).

18. A computer system for filtering content submitted by a user for dissemination over a communication forum, the computer system comprising:

a software program, stored in a computer readable storage medium, that when loaded into a memory and executed by the computer system intercepts the content submitted by a user at the time of submission by the user through an input device for dissemination over a communication forum;

a blocking subroutine of said software program for filtering said intercepted content;

a preprocessing subroutine of said software program for preprocessing a copy of said intercepted content to yield a modified content which reduces said intercepted content to its least common denominator, wherein said preprocessing subroutine;

analyzes said intercepted content for HTML tags, wherein when there are no HTML tags said preprocessing subroutine;

converts each white space to a space, wherein said white space is a one of a space, a tab, a return, an end of line character, and any other character that is displayed on a display device as said white space to a viewer;

removes each punctuation character at an end of a word, wherein said word is a string of characters;

converts each uppercase letter into a corresponding lowercase letter;

performs a character mapping on the intercepted content;

changes a three or more of any consecutively repeated character to two of said consecutively repeated character or to a one of said consecutively repeated character based upon a predefined list; and deletes any remaining spaces at the end of said intercepted content;

wherein when there are HTML tags said preprocessing subroutine:

separates said HTML tags when present from a non-HTML text of said intercepted content;

concatenates said non-HTML text with a space where said HTML tag was located in said intercepted content;

sends said concatenated non-HTML text back to the beginning of said preprocessing subroutine for continued processing;

copies a text inside said HTML tags to a file; and sends said text inside said HTML tags for simplified processing through said preprocessing subroutine by performing only a portion of the processing;

a content breakdown subroutine of said software program for breaking said modified content down into a plurality of strings of words, wherein each successive string of words drops the first word from the previous string of words;

a secondary database of undesirable terms accessed by said software program, wherein a list of previously identified undesirable terms are stored, and further wherein each of said previously identified undesirable terms is a word or a phrase; and a recursive comparison subroutine of said software program for processing recursively each of said plurality of strings of words to identify at least one undesirable term that matches a one of said previously identified undesirable terms stored in said secondary database of undesirable terms;

wherein when said at least one undesirable term is identified, said blocking subroutine blocks the content submitted by the user to the communication forum from appearing on the communication forum.

19. The computer system according to claim 18 wherein said preprocessing subroutine during said character mapping:

finds each character or a string of characters having a one-to-one relationship with a predetermined phonetic or symbolic character, wherein each said character or said string of characters having said one-to-one relationship is replaced with its said predetermined phonetic or symbolic character;

replaces each remaining non-replaced numeric character with a zero; and replaces each remaining non-replaced predetermined non-numeric character and each remaining non-replaced predetermined non-alphabetic character with an asterisk.

20. The computer system according to claim 18 further comprising:

a database accessed by said software program; and a predefined alias character list stored in said database, wherein each of said alias characters is a predefined character mapping where more than one character in an ordered sequence is mapped to a single character, wherein a first character of a first of said plurality of strings of words is checked by said recursive comparison subroutine against said predefined alias character list, and when a match is found, a temporary alias list is built for said first character, wherein said recursive comparison subroutine substitutes each of said alias characters in said list for said first character in said ordered sequence for processing.

21. The computer system according to claim 20 wherein said database further comprises:

a list of replacement terms, wherein a one of said replacement terms is used to replace said at least one undesirable term in the content for dissemination over the communication forum.

22. The computer system according to claim 18 wherein said software program further comprises:

a matching subroutine which processes said intercepted content to identify new permutations of undesirable terms and adding the new permutations to the database as not reviewed terms.

23. The computer system according to claim 22 wherein the communication forum is a one of a an internal email system, an external email system, an instant messaging system, a message board, and a chat room, the computer system further comprising:

a sponsor of the communication forum, wherein said sponsor is a one of a web site owner, a website sponsor, an internet service provider, and a company providing an intranet to its employees.

24. The computer system according to claim 23 further comprising:

a sponsor interface, wherein a one or more not reviewed terms generated by said matching subroutine and stored in a database are reviewed by said sponsor, are assigned a category by said sponsor, and stored in said database or in said secondary database of undesirable terms based upon said category assigned to said one or more not reviewed terms.

25. The computer system according to claim 18 further comprising:

a server computer, wherein said server computer supports the communication forum, and said software program resides on said server computer.

26. The computer system according to claim 18 further comprising:

a client computer; and a web browser residing on said client computer;

wherein the user accesses said communication forum from said client computer through said web browser.

27. The computer system according to claim 18 further comprising:

a matching breakdown subroutine to identify at least one matching phrase, wherein said matching breakdown subroutine breaks the content up into a plurality of strings, wherein each successive one of said plurality of strings begins with a successive character of the content which are processed through a recursive matching comparison subroutine.

28. The computer system according to claim 27 wherein said recursive matching comparison subroutine recursively processes each of said plurality of strings to attempt to identify said at least one matching phrase that is similar to a one of said previously identified undesirable terms stored in said secondary database of undesirable terms, and when said at least one matching phrase has been identified, storing said at least one matching phrase in a memory.

29. A computer readable storage medium storing instructions that, when executed by a processor, cause the processor to perform a method for filtering content submitted by a user for dissemination over a communication forum, the method comprising the steps of:

(a) intercepting the content submitted by the user at the time of submission by the user to the communication forum;

(b) preprocessing a copy of said intercepted content through a preprocessing subroutine to yield a modified content by reducing said intercepted content to its least common denominator, wherein said preprocessing step further comprises the steps of:

(b1) analyzing said intercepted content for HTML tags, wherein when there are no HTML tags, performing steps (b2) through (b7), and when there are HTML tags, performing steps (b8) through (b12);

(b2) converting each white space to a space, wherein said white space is a one of a space, a tab, a return, an end of line character, and any other character that is displayed on a display device as said white space to a viewer;

(b3) removing each punctuation character at an end of a word, wherein said word is a string of characters;

(b4) converting each uppercase letter into a corresponding lowercase letter;

(b5) performing a character mapping on the results of said steps (b2), (b3), and (b4) of the intercepted content;

(b6) utilizing the results of said step (b5), changing a three or more of any consecutively repeated character to two of said consecutively repeated character or to a one of said consecutively repeated character based upon a predefined list; and (b7) deleting any remaining spaces at the end of said intercepted content;

(b8) separating said HTML tags from a non-HTML text of said intercepted content;

(b9) concatenating said non-HTML text with a space where said HTML tag was located in said intercepted content;

(b10) sending said concatenated non-HTML text to said converting step (b2) for continued processing;

(b11) copying a text inside said HTML tags to a file; and (b12) processing said text inside each said HTML tags through steps (b2), (b4), and (b7);

(c) breaking said modified content down through a content breakdown subroutine into a plurality of strings of words, wherein each successive string of words drops the first word from the previous string of words;

(d) processing each of said plurality of strings of words through a recursive comparison subroutine to attempt to identify at least one undesirable term that matches a previously identified undesirable term stored in a secondary database of undesirable terms, wherein each of said previously identified undesirable terms is a word or a phrase; and (e) when said at least one undesirable term is identified, blocking the content submitted by the user to the communication forum from appearing on the communication forum.

30. The computer readable storage medium according to claim 29 wherein performing a character mapping step (b5) further comprises the steps of:

(b5a) finding each character or a string of characters having a one-to-one relationship with a predetermined phonetic or symbolic character, wherein each said character or said string of characters having said one-to-one relationship is replaced with its said predetermined phonetic or symbolic character;

(b5b) replacing each remaining non-replaced numeric character with a zero; and (b5c) replacing each remaining non-replaced predetermined non-numeric character and each remaining non-replaced predetermined non-alphabetic character with an asterisk.

31. The computer readable storage medium according to claim 29 wherein processing step (d) further comprises the steps of:

(d1) checking a first character of a first of said plurality of strings of words against a predefined alias character list, wherein each of said alias characters is a predefined character mapping where more than one character in an ordered sequence is mapped to a single character;

(d2) when a match is found in said step (d1) for said first character of a first word of said first plurality of strings of words, building a temporary alias list for said first character;

(d3) comparing said first character against a first character of all said previously identified undesirable terms in said secondary database of undesirable terms for a match;

(d4) when a match is found, checking to see if said first character is at an end of said first word;

(d5) when said first character is not at said end of said first word, calling, by said recursive comparison subroutine, said recursive comparison subroutine recursively;

(d6) moving to a next character in said first word of said first plurality of strings of words;

(d7) repeating steps (d1) through (d6) for said next character;

(d8) repeating step (d7) for each remaining character in said first word of said first plurality of strings of words;

(d9) repeating steps (d1) through (d8) for each next word in said first of said plurality of strings of words; and (d10) repeating steps (d1) through (d9) for the remaining plurality of strings of words.

32. The computer readable storage medium according to claim 31 wherein building step (d2) further comprises the steps of:

(d2a) when a match is not found for said first character of a first word of said first plurality of strings of words, determining if there are any of said alias characters left for said first character of said first word;

(d2b) when said determining step (d2a) result is yes, replacing said first character of said first word with a next alias character in said ordered sequence and passing control to said comparing step (d3) for continued processing;

(d2c) when said determining step (d2a) result is no, determining if said recursive comparison subroutine is pointing to said first character of said first word of said first plurality of strings of words on its way back up from said recursion;

(d2d) when said determining step (d2c) result is no, stepping back up a level recursively to a previous character position and passing control to said determining step (d2a) for continued processing;

(d2e) when said determining step (d2c) result is yes, returning any said at least one undesirable terms found to said blocking step (e).

33. The computer readable storage medium according to claim 32 wherein checking step (d4) further comprises the steps of:

(d4a) when said first character is at an end of said first word, determining if a flag has been set in said secondary database of undesirable terms, wherein said flag is set at an end of each of said previously identified undesirable terms;

(d4b) when said determining step (d4a) result is yes, indicating that said first word matches a one of said previously identified undesirable terms, saving into a memory said first word as said at least one undesirable term, and passing control to step (d4c);

(d4c) when said determining step (d4a) result is no, or after said saving step (d4b), determining if said recursive comparison subroutine has reached an end of said first of said plurality of strings of words;

(d4d) when said determining step (d4c) result is no, passing control to said calling step (d5) for continued processing; and (d4e) when said determining step (d4c) result is yes, passing control to step (d2c).

34. The computer readable storage medium according to claim 33 wherein returning step (d2e) further comprises the steps of:

(d2e1) when any said at least one undesirable terms are returned from said recursive comparison subroutine, determining if a replacement option has been selected;

(d2e2) when said determining step (d2e1) result is yes, checking a database for a replacement term for any of said at least one undesirable terms;

(d2e3) when said determining step (d2e1) result is no, passing control to step (d2e5);

(d2e4) when said determining step (d2e2) result is yes, replacing any of said at least one undesirable terms with said replacement terms in the content yielding a replacement string;

(d2e5) when said determining step (d2e2) result is no, storing any of said at least one undesirable terms in said memory;

(d2e6) determining if a search for another match option has been selected;

(d2e7) when said determining step (d2e6) result is no, determining if there are any words left to test in said first plurality of strings of words;

(d2e8) when said determining step (d2e6) result is yes, passing control to said blocking step (e);

(d2e9) when said determining step (d2e7) result is no, passing control to said blocking step (e); and (d2e10) when said determining step (d2e7) result is yes, returning any said at least one undesirable terms and any said replacement string to said processing step (d).

35. The computer readable storage medium according to claim 34 further comprising the steps of:

(d2e11) when any said at least one undesirable terms are not returned from said recursive comparison subroutine, passing control to said step (d2e7); and (d2e12) when said determining step (d2e7) result is no, passing control to said blocking step (e) with an OK indication.

36. The computer readable storage medium according to claim 35 wherein blocking step (e) further comprises the steps of:

(e1) when no said at least one undesirable terms have been returned from said processing step (d), determining if any said OK indication or any said replacement string has been returned;

(e2) when said determining step (e1) result is said OK indication, posting the content to the communication forum;

(e3) when said determining step (e1) result is said replacement string, replacing all or part of the content with said replacement string yielding an altered content;

(e4) determining if a notify user option has been selected;

(e5) when said determining step (e4) result is yes, notifying the user that all or part of the content has been replaced;

(e6) posting said altered content to the communication forum; and (e7) when said determining step (e4) result is no, posting said altered content to the communication forum without notifying the user.

37. A computer readable storage medium storing instructions that, when executed by a processor, cause the processor to perform a method for filtering content submitted by a user for dissemination over a communication forum, the method comprising the steps of:

(a) intercepting the content submitted by the user at the time of submission by the user to the communication forum;

(b) preprocessing a copy of said intercepted content through a preprocessing subroutine to yield a modified content by reducing said intercepted content to its least common denominator;

(c) breaking said modified content down through a content breakdown subroutine into a plurality of strings of words, wherein each successive string of words drops the first word from the previous string of words;

(d) processing each of said plurality of strings of words through a recursive comparison subroutine to attempt to identify at least one undesirable term that matches a previously identified undesirable term stored in a secondary database of undesirable terms, wherein each of said previously identified undesirable terms is a word or a phrase; and (e) when said at least one undesirable term is identified, blocking the content submitted by the user to the communication forum from appearing on the communication forum;

(f) storing in a file the content intercepted from the user, a user ID for the user, and any OK indications, any undesirable terms, and any replacement string resulting from preprocessing step (b), breaking step (c), and processing step (d);

(g) processing said intercepted content through a matching subroutine to identify new permutations of undesirable terms, wherein said processing said intercepted content step further comprises the steps of:

(g1) repeating preprocessing step (b) for said intercepted content;

(g2) removing any white space from said intercepted content remaining after said preprocessing step (b);

(g3) processing said intercepted content through a matching breakdown subroutine to attempt to identify at least one matching phrase;

(g4) when said at least one matching phrase has been identified, determining if a first of said at least one matching phrase is already stored in a database of terms;

(g5) when said determining step (g4) result is yes, passing control to said determining step (g7) for continued processing;

(g6) when said determining step (g4) result is no, entering said at least one matching phrase into said database of terms as a not reviewed term;

(g7) determining if there is a next said at least one matching phrase;

(g8) when said determining step (g7) result is yes, passing control to said determining step (g4) for said next said at least one matching phrase; and (g9) when said determining step (g7) result is no, passing control to said erasing step (h); and (h) erasing said file.

38. The computer readable storage medium according to claim 37 wherein step (g6) further comprises reviewing said not reviewed term and designating a category for said not reviewed term.

39. The computer readable storage medium according to claim 37 wherein processing step (g3) further comprises the steps of:

(g3a) breaking the content up into a plurality of strings, wherein each successive one of said plurality of strings begins with a successive character of the content;

(g3b) processing a first of said plurality of strings through a recursive matching comparison subroutine to attempt to identify said at least one matching phrase that is similar to a one of said previously identified undesirable terms stored in said secondary database of undesirable terms;

(g3c) determining if said at least one matching phrase has been identified in said first of said plurality of strings;

(g3d) when said determining step (g3c) result is no, determining if there are more of said plurality of strings to be processed;

(g3e) when said determining step (g3d) result is yes, passing control to said processing step (g3b) for a next of said plurality of strings;

(g3f) when said determining step (g3d) result is no, passing control to said determining step (g4);

(g3g) when said determining step (g3c) result is yes, determining if an option to look for only a one of said at least one matching phrase has been selected;

(g3h) when said determining step (g3g) result is no, storing said at least one matching phrase in a memory and passing control to said determining step (g3d); and (g3i) when said determining step (g3g) result is yes, passing control to said determining step (g4).

40. The computer readable storage medium according to claim 39 wherein processing step (g3b) further comprises the steps of:

(g3b1) checking a first character of a first of said plurality of strings against a predefined alias character list, wherein each of said alias characters is a predefined character mapping where more than one character in an ordered sequence is mapped to a single character;

(g3b2) when a match is found in said step (g3b1) for said first character of said first of said plurality of strings, building a temporary alias character list for said first character;

(g3b3) comparing said first character against a first character of all said previously identified undesirable terms in said secondary database of undesirable terms for a match;

(g3b4) when a match is found, counting the match toward a predetermined total of counted matches needed to identify said at least one matching phrase;

(g3b5) for said match, determining if a flag has been set in a current position of said previously identified undesirable term in said secondary database of undesirable terms, indicating an end of said previously identified undesirable term;

(g3b6) when said determining step (g3b5) result is no, passing control to step (g3b10);

(g3b7) when said determining step (g3b5) result is yes, determining if a total of said counted matches is equal to said predetermined total of counted matches needed to identify said at least one matching phrase;

(g3b8) when said determining step (g3b7) result is yes, saving said first of said plurality of strings as said at least one matching phrase;

(g3b9) when said determining step (g3b7) result is no, passing control to step (g3b10);

(g3b10) determining if said recursive matching comparison subroutine has reached an end of said first of said plurality of strings;

(g3b11) when said determining step (g3b10) result is no, calling, by said recursive matching comparison subroutine, said recursive matching comparison subroutine recursively;

(g3b12) moving to a next character in said first of said plurality of strings and passing control to said checking step (g3b1) for said next character;

(g3b13) repeating steps (g3b1) through (g3b12) for said next character; and (g3b14) repeating step (g3b13) for each remaining character in said first of said plurality of strings.

41. The computer readable storage medium according to claim 40 wherein step (g3b7) further comprises requiring said predetermined total of counted matches to be a percentage of the total number of characters in said previously identified undesirable term to identify said at least one matching term.

42. The computer readable storage medium according to claim 40 wherein step (g3b7) further comprises requiring said predetermined total of counted matches to be a hard coded number that is based upon the total number of characters in said previously identified undesirable term, said hard coded number being less than or equal to the number of characters in said previously identified undesirable term, in order to identify said at least one matching term.

43. The computer readable storage medium according to claim 40 wherein comparing step (g3b3) further comprises the steps of:

(g3b3a) when a match is not found, determining if there are any said alias characters in said temporary alias character list left to be used for comparison in place of said first character;

(g3b3b) when said determining step (g3b3a) result is yes, replacing said first character with a first alias character in said temporary alias character list and passing control to said comparing step (g3b3) for said first alias character;

(g3b3c) when said determining step (g3b3a) result is no, determining if there are any wildcards left to substitute for said first character; and (g3b3d) when said determining step (g3b3c) result is yes, replacing said first character with said wildcard and passing control to said comparing step (g3b3).

44. The computer readable storage medium according to claim 43 wherein step (g3b3c) further comprises requiring said wildcard to be used for said first character in said first of said plurality of strings for at least a one of replacing said first character when there is not a direct match, taking the place of an absent character to expand said first of said plurality of strings, and matching a void to contract said first of said plurality of strings.

45. The computer readable storage medium according to claim 43 wherein determining step (g3b10) further comprises the steps of:

(g3b10a) when said determining step (g3b3c) result is no, passing control to step (g3b10b);

(g3b10b) when said determining step (g3b10) result is yes, determining if said recursive matching comparison subroutine is pointing to said first string position;

(g3b10c) when said determining step (g3b10b) result is no, stepping back up a level recursively to a previous character position and returning to said determining step (g3b3a) for continued processing;

(g3b10d) when said determining step (g3b10b) result is yes, passing control to said determining step (g3c).

* * * * *

UNITED STATES PATENT AND TRADEMARK OFFICE

CERTIFICATE OF CORRECTION

PATENT NO. : 7,549,119 B2
APPLICATION NO. : 10/992255
DATED : June 16, 2009
INVENTOR(S) : McCaffrey et al.

It is certified that error appears in the above-identified patent and that said Letters Patent is hereby corrected as shown below:

Column 21,
Line 43 claim 1, Add the word -- content; -- after the words "of said intercepted".

Signed and Sealed this

Fourth Day of August, 2009

JOHN DOLL
*Acting Director of the United States Patent and Trademark Office*